US012772940B2

(12) United States Patent
Hamilton et al.

(10) Patent No.: US 12,772,940 B2
(45) Date of Patent: Oct. 27, 2026

(54) ROTATING PLANTER APPARATUS

(71) Applicants: James Hamilton, Steamboat Springs, CO (US); Nancy Hamilton, Steamboat Springs, CO (US)

(72) Inventors: James Hamilton, Steamboat Springs, CO (US); Nancy Hamilton, Steamboat Springs, CO (US)

( * ) Notice: Subject to any disclaimer, the term of this patent is extended or adjusted under 35 U.S.C. 154(b) by 0 days.

(21) Appl. No.: 19/232,818

(22) Filed: Jun. 9, 2025

(65) Prior Publication Data

US 2025/0374878 A1 Dec. 11, 2025

Related U.S. Application Data

(60) Provisional application No. 63/658,301, filed on Jun. 10, 2024.

(51) Int. Cl.
*A01G 31/02* (2006.01)

(52) U.S. Cl.
CPC .......... *A01G 31/025* (2025.01); *A01G 31/065* (2025.01)

(58) Field of Classification Search
CPC ... A01G 31/025; A01G 31/024; A01G 31/021
See application file for complete search history.

(56) References Cited

U.S. PATENT DOCUMENTS

| | | | | |
|---|---|---|---|---|
| 9,374,952 B1 * | 6/2016 | Cross | A01G 31/047 | |
| 11,310,976 B1 * | 4/2022 | Cross | A01G 27/003 | |
| 2012/0090236 A1 * | 4/2012 | Orr | A01G 31/02 | 47/62 A |
| 2014/0000162 A1 * | 1/2014 | Blank | A01G 31/06 | 47/62 A |
| 2015/0181821 A1 * | 7/2015 | Park | A01K 63/006 | 47/62 R |
| 2024/0349668 A1 * | 10/2024 | Holm | A01G 31/02 | |

* cited by examiner

*Primary Examiner* — Joshua D Huson
*Assistant Examiner* — Alanna K Peterson
(74) *Attorney, Agent, or Firm* — Roger A. Jackson

(57) ABSTRACT

A rotating planter apparatus being a vertical planter that is disposed upon a resting surface utilizing a light source, the rotating planter including a first surrounding sidewall, a second surrounding sidewall, and an annular buoyant element that includes a submerged side and an opposing top side, wherein the submerged side is disposed within the second surrounding sidewall that has a circulating fluid to rotate the buoyant element from a pump in the first surrounding sidewall that acts as a fluid reservoir. Also, a third surrounding sidewall that is mounted on the buoyant element top side, a portion of the pump fluid output goes to an interior of the third surrounding sidewall to water plants disposed therethrough the third surrounding sidewall wherein the water gravity flows back to the pump, with the rotating third surrounding sidewall facilitating selectable exposure to the plants from the light source.

20 Claims, 11 Drawing Sheets

ROTATING PLANTER APPARATUS

CROSS-REFERENCE TO RELATED APPLICATION

This patent application claims the benefit of U.S. provisional patent application Ser. No. 63/658,301 filed on Jun. 10, 2024, by James Hamilton of Steamboat Springs, Colorado U.S. and Nancy Hamilton of Steamboat Springs, Colorado U.S.

BACKGROUND OF INVENTION

The present invention is generally based on a vertical type of garden that usually includes several planter pods on the outside and around the circumference of a vertically positioned cylinder, the present invention is similar in many ways to products already in the marketplace that are more particularly called a "Tower Garden".

However, when in operation there is a front and a back to the Tower Garden, the front being the side that faces the sun or light source and the back being the side that's in the shade. Due to this design, gardeners find themselves having to manually rotate their Tower Gardens throughout the day so that all the plants get some sunlight or other light from the light source. The typical Tower Garden consists of a lower base unit and an upper tower cylinder unit that rests upon the top of the lower base unit. A reservoir that is in the base unit is used for holding the liquid plant nutrients that are suspended in water (hydroponics). Also in the reservoir is a small submersible pump and motor used to pump the nutrient solution to the top of the tower via a plastic tube where it then freefalls via gravity back down the inside of the cylinder supplying the roots of the plants contained in the basket style planter pods the nutrient solution.

The present invention includes a base that is also a reservoir, and a submersible pump and motor disposed within the reservoir for pumping nutrient solution to the top of a cylindrical tower. However, instead of the tower sitting statically upon the base/reservoir, it sits on a float/impeller type apparatus that is floating on top of the water contained within the reservoir. This enables the cylindrical tower to rotate freely and independent of the base/reservoir. Next, a portion of the water/nutrient solution that is being pumped to the top of the cylindrical tower is diverted in such a way that it creates a rotational current within a nested additional reservoir. The float/impeller is then caught in the rotational current and it rotates the cylindrical tower containing the plant pods so that each plant gets an equal amount of sunlight or light from another light source per day.

Of course, there are several ways to rotate the cylindrical tower separate from the base reservoir. The present invention design is perhaps the simplest because it does it by using the energy already created by the pump and motor that is currently being used to move the nutrient solution to the top of the tower.

Therefore, there exists a long-felt need in the art for an improved Tower Garden, that can eliminate the need to manually rotate the base and cylinder to distribute light more evenly from the light source for the Tower Garden, without having the requirement for any significant added energy (typically electrical power) for the rotation of the cylinder.

Looking at the prior art in this area starting with United States Patent Application Publication Number 2021/0127608 to Hardgrove, discloses a surface mounted hydroponic gardening system with a nutrient water circulatory system with a submersible pump/motor and tubing with the pump in a reservoir that supplies through the tubing and dispersed to the plant site holes. Note that there is no teaching of a floating tower relative to the base, nor of a rotating tower relative to the base.

Further, in the prior art in this area looking at United States Patent Application Publication Number 2017/0105372 to Bryan, discloses a hydroponic plant cultivating apparatus that includes a plant tower with angled plant baskets that is supported by a reservoir that holds a fluid with a submerged pump/motor that pumps the fluid to the top of the tower and allowing the fluid to gravity trickle downward. Note again in Bryan, that there is no teaching of a floating tower relative to the base, nor of a rotating tower relative to the base.

Continuing, in U.S. Pat. No. 10,791,688 to Walters, teaches a net basket cup holder for use with hydroponic vertical towers wherein the basket cup is disposed therethrough a tower sidewall at an upward angle being inside to outside. Note that in Walters, there is no teaching of a floating tower relative to the base, nor of a rotating tower relative to the base.

Further, in U.S. Pat. No. 10,136,594 to Blank, teaches an overhead suspended aeroponic growing system with plant towers that are suspended from overhead grow lights with a reservoir underneath having a submerged pump and motor to force the nutrient fluid upwards to the top of the tower. There is an option in Blank to rotate the tower from an overhead shaft with motor with a plurality of grow lights suspended vertically in a juxtapose manner in relation to the tower. Noting that there is no teaching in Blank as to a tower that is floating as supported by the nutrient reservoir that is rotationally driven by hydraulic paddles.

What is needed for the present invention of the tower garden is a way to provide for selectable light source exposure to the tower plants from a fixed position light source via a rotating tower that is automatic and does not require any significant additional electrical energy that is already being used for tower watering from a support reservoir.

SUMMARY OF THE INVENTION

Broadly the present invention is the rotating planter apparatus that is in the form of the vertical planter that is disposed upon the resting surface and placed into the environment utilizing the external light source, the rotating planter apparatus including a first surrounding sidewall that is about a longitudinal axis, the first surrounding sidewall having a first distal end portion and an opposing first proximal end portion with the longitudinal axis spanning therebetween, the first surrounding sidewall further including a first inner surface and an opposing first outer surface. Further, a first base that is affixed to the first proximal end portion of the first surrounding sidewall, the first base includes a first base inside surface and an opposing first base outside surface, wherein the first base outside surface is adjacent to the resting surface, the first surrounding sidewall further including a first interior defined by the first inner surface and the first inner surface. Also included is a second surrounding sidewall that is about the longitudinal axis, the second surrounding sidewall having a first end portion and an opposing second end portion with the longitudinal axis spanning therebetween, the second surrounding sidewall further including a second inner surface and an opposing second outer surface.

Also included is a second base that is affixed to the first end portion of the second surrounding sidewall, the second base includes a second base inside surface and an opposing second base outside surface, the second surrounding sidewall further including a second interior defined by the second inner surface and the second base inside surface. In addition, an annular buoyant element that is about the longitudinal axis, the annular buoyant element includes an outer periphery that is about the longitudinal axis and an opposing inner margin that is about the longitudinal axis, further the annular buoyant element includes a submerged side and an opposing top side, wherein the submerged side and the top side are both positioned perpendicular to the longitudinal axis, wherein the submerged side is disposed within the second interior, further a plurality of paddle extensions are disposed on the outer periphery that each extend outward in a perpendicular radial fashion from the longitudinal axis.

Plus, a tower structure that is constructed from a third surrounding sidewall that is about the longitudinal axis, the third surrounding sidewall includes a third proximal end portion and an opposing third distal end portion with a third mid portion therebetween, with the longitudinal axis spanning therebetween the third proximal end portion, the third mid portion, and the third distal end portion, the third surrounding sidewall further includes a third inner surface and an opposing third outer surface, the third distal end portion terminating in a third margin, the third surrounding sidewall further includes a drain aperture disposed therethrough from the third outer surface to the third inner surface in the third proximal end portion and a plant aperture disposed therethrough from the third outer surface to the third inner surface in the third mid portion, the third proximal end portion is removably engaged to the topside of the buoyant element. Further, a cover having a cover outer surface and an opposing cover inner surface, the cover is removably engageable to the third distal end portion, said the surrounding sidewall having a third interior defined by the third inner surface, the cover inner surface, and the topside. Plus, a pump and motor combination with a suction fluid communication structure that is in fluid communication with the first interior, the pump and motor combination further includes a discharge fluid communication structure. Also included is a primary fluid communication structure from the discharge fluid communication structure to the tower structure third interior.

In addition, a secondary fluid communication structure from the discharge fluid communication structure to a spray nozzle that is disposed within the second interior, wherein operationally a nutrient rich fluid is disposed within the first interior, wherein the pump and motor combination creates a pressure movement flow of the nutrient rich fluid from the suction fluid communication structure to the discharge fluid communication structure and onward to the primary fluid communication structure to discharge the nutrient rich fluid into the third interior, further the discharge fluid communication structure discharges the nutrient rich fluid through the secondary fluid communication structure to the spray nozzle to create a rotational movement of the nutrient rich fluid within the second interior to contact the plurality of paddle extensions and to rotate the annular buoyant element that is resting on a buoyancy force and to support the tower structure that is in rotational lockstep with the annular buoyant element resulting in having rotation of the tower structure to provide the nutrient rich fluid to a plant disposed within the plant aperture and to provide selectable exposure to the light source through the tower structure rotation.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 2 shows a side elevation view of the rotating planter apparatus as shown in FIG. 1, wherein FIG. 2 is a full cross section of the rotating planter apparatus that includes the first surrounding sidewall that contains the nutrient rich fluid with the pump/motor combination disposed in the nutrient rich fluid in the first interior, further shown is the second surrounding sidewall and second base that is supported by the primary fluid communication structure, a portion of the pump discharge creates through jet nozzles a rotating fluid within the second interior that in turn drive the annular buoyant element via paddle extensions that in turn rotating the third surrounding sidewall that is supported by the annular buoyant element that not only rotates the plants disposed within the plant apertures for more even light source exposure, but also utilizes a remaining portion of the pump output to water the plants through gravity flow of the nutrient rich fluid down through the third surrounding sidewall third interior;

FIG. 3 shows a cross section cut 3-3 from FIG. 2, wherein FIG. 3 shows the annular buoyant element with the paddle extensions from the submerged side also showing rotation of the annular buoyant element;

FIG. 4 shows a cross section cut 4-4 from FIG. 2, wherein FIG. 4 shows the second surrounding sidewall second interior with the spray nozzles showing the circular circulation of the nutrient rich fluid from a portion of the pump output;

FIG. 7 shows a side elevation view of the rotating planter apparatus as shown in FIG. 1, wherein FIG. 7 is a full cross section of the rotating planter apparatus that includes the first surrounding sidewall that contains the nutrient rich fluid with the pump disposed in the nutrient rich fluid in the first interior, further shown is the second surrounding sidewall and second base that is supported by the primary fluid communication structure, a portion of the pump discharge creates through jet nozzles a rotating fluid within the second interior that in turn drive the annular buoyant element without the paddle extensions, that in turn rotating the third surrounding sidewall that is supported by the annular buoyant element that not only rotates the plants disposed within the plant apertures for more even light source exposure, but also utilizes a remaining portion of the pump output to water the plants through gravity flow of the nutrient rich fluid down through the third surrounding sidewall third interior;

FIG. 8 shows a cross section cut 8-8 from FIG. 7, wherein FIG. 8 shows the annular buoyant element without the paddle extensions from the submerged side also showing rotation of the annular buoyant element;

FIG. 9 shows a side elevation view of the rotating planter apparatus as shown in FIG. 1, wherein FIG. 9 is a full cross section of the rotating planter apparatus that includes the first surrounding sidewall that contains the nutrient rich fluid with the pump/motor combination disposed external to the first surrounding sidewall in the external environment being in suction and discharge fluid communication with the nutrient rich fluid disposed within the first interior, further shown is the second surrounding sidewall and second base that is supported by the primary fluid communication structure, a portion of the pump discharge creates through jet nozzles a rotating fluid within the second interior that in turn drive the annular buoyant element via paddle extensions that in turn rotating the third surrounding sidewall that is supported by the annular buoyant element that not only rotates the plants disposed within the plant apertures for more even light source exposure, but also utilizes a remaining portion of the pump output to water the plants through gravity flow of the nutrient rich fluid down through the third surrounding sidewall third interior;

FIG. 10 is cross section view 10-10 from FIG. 11, wherein FIG. 10 shows the quasi Gerotor hydraulic pump that includes the alternative first surrounding sidewall, the alternative first surrounding sidewall interior, the alternative second surrounding sidewall that is disposed within the alternative first surrounding sidewall interior, the alternative second inner surface that includes the plurality of adjacent convex segments, the plurality of concave valleys that are each disposed in-between the plurality of adjacent convex segments forming a continuous surface, the alternative second interior, and the alternative buoyant element having an outer periphery that includes a plurality of concave recesses that are each separated by a plurality of convex peaks, wherein the total number of convex peaks is one less than the total number of concave valleys, further included is a pressurized inlet flow into the alternative second interior and an outlet flow from the alternative second interior to the alternative first interior resulting in a circular flow of the nutrient rich fluid within the alternative second interior about the longitudinal axis that in turn causes the alternative buoyant element to rotate about the longitudinal axis; and FIG. 11 shows a side elevation view of the alternative rotating planter apparatus basically as shown in FIG. 1, wherein FIG. 11 is a full cross section of the alternative rotating planter apparatus that includes the alternative first surrounding sidewall that contains the nutrient rich fluid with the pump/motor combination disposed in the nutrient rich fluid in the alternative first interior, further shown is the alternative second surrounding sidewall and the alternative second base that is supported by the primary fluid communication structure, a portion of the pump discharge is routed through the alternative secondary fluid communication structure that through the jet nozzle discharges a rotating fluid within the alternative second interior at the inlet that in turn drives the alternative annular buoyant element via the plurality of concave recesses and the plurality of convex peaks in conjunction with the plurality of convex segments and plurality of concave valleys within the alternative second interior to rotate the alternative annular buoyant element and the third surrounding sidewall that is supported by the alternative annular buoyant element via buoyancy of the nutrient rich fluid disposed within the alternative second interior, that not only rotates the third surrounding sidewall with the plants disposed within the plant apertures about the longitudinal axis for more even light source exposure, but also utilizes a remaining portion of the pump output to water the plants through gravity flow of the nutrient rich fluid down through the third surrounding sidewall third interior.

DETAILED DESCRIPTION OF THE INVENTION

Figure 1:
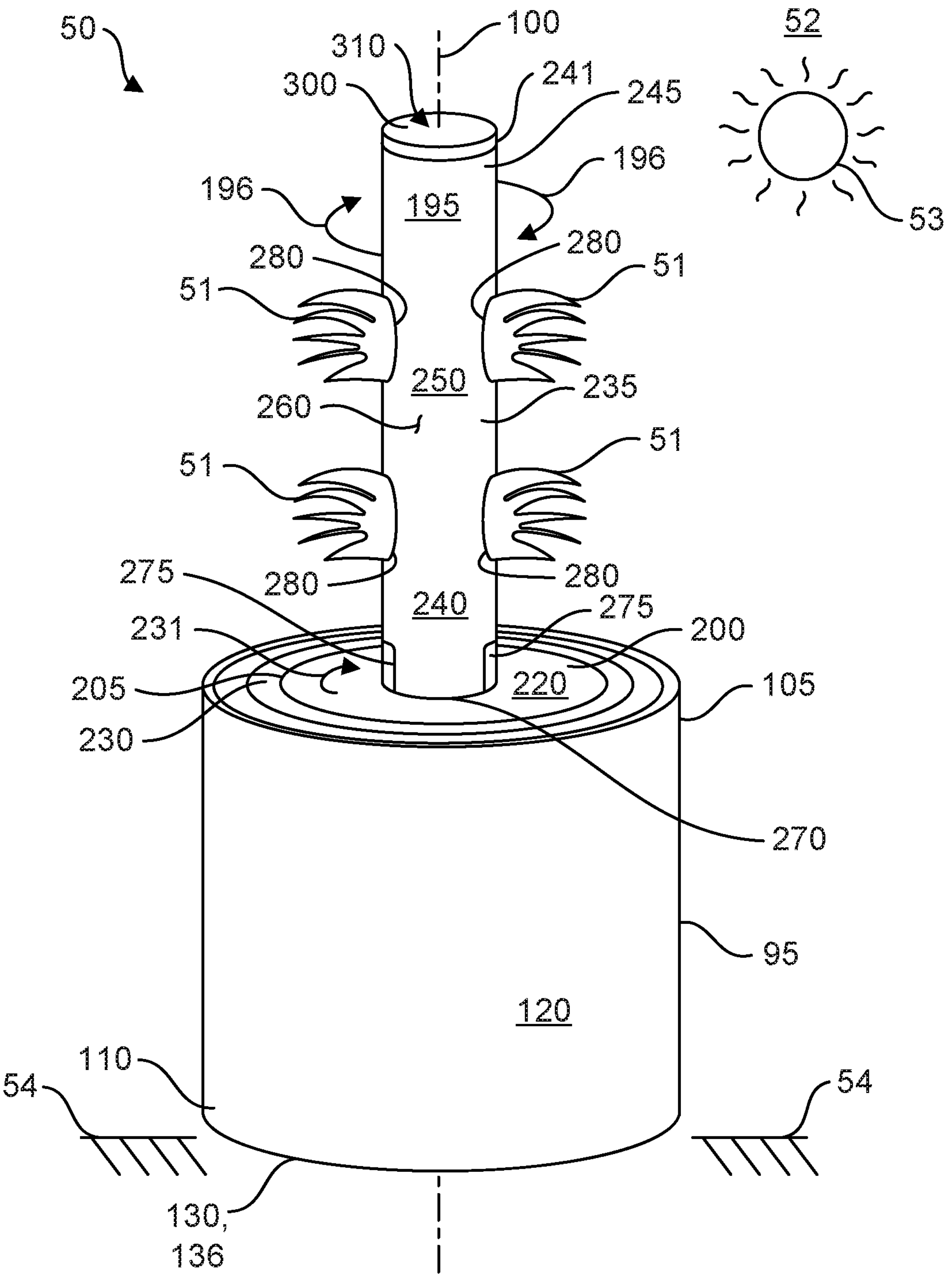
FIG. 1 shows an upper perspective view of the rotating planter apparatus that includes the first surrounding sidewall resting upon the surface with the first base, the rotating assembly including the third surrounding sidewall, the cover, and the plant apertures disposed within the third surrounding sidewall that have the plants disposed with the plant apertures, further the light source is shown, that is usually fixed in position with the rotating third surrounding sidewall facilitating the light source reaching all of the plants that are disposed circumferentially about the third surrounding sidewall.

50 Rotating Planter Apparatus in the form of a vertical planter
51 Plant
52 Environment external to the rotating planter apparatus 50
53 External light source that can be outside sunlight or inside artificial light
54 Resting surface
55 Nutrient rich fluid
56 Alternative embodiment of the Rotating Planter Apparatus
60 Substantially static operational state of the nutrient rich fluid 55
65 Substantially rotational movement of the nutrient rich fluid 55
70 Pressure movement of the nutrient rich fluid 55
75 Spray nozzle velocity of the nutrient rich fluid 55
76 Gravity flow of the nutrient rich fluid 55
80 Pump 165 suction flow of the nutrient rich fluid 55
85 Pump out spillover flow of the nutrient rich fluid 55
90 Buoyancy force of the nutrient rich fluid 55
95 First surrounding sidewall
96 Alternative first surrounding sidewall
100 Longitudinal axis
105 First distal end portion of the of the first surrounding sidewall 95
106 Alternative first distal end portion of the alternative first surrounding sidewall 96
110 First proximal end portion of the first surrounding sidewall 95
111 Alternative first proximal end portion of the alternative first surrounding sidewall 96
115 First inner surface of the first surrounding sidewall 95
116 Alternative first inner surface of the alternative first surrounding sidewall 96
120 First outer surface of the first surrounding sidewall 95
121 Alternative first outer surface of the alternative first surrounding sidewall 96

125 First interior of the first surrounding sidewall 95

126 Alternative first interior of the alternative first surrounding sidewall 96

130 First base of the first surrounding sidewall 95

131 Alternative first base of the alternative first surrounding sidewall 96

135 First inside surface of the first base 130

136 First outside surface of the first base 130

137 First base 130 support for the tower 195 fluid communication structure 190

138 Alternative first inside surface of the alternative first base 131

139 Alternative first outside surface of the alternative first base 131

140 Second surrounding sidewall

141 Alternative second surrounding sidewall

142 Plurality of adjacent convex segments disposed upon the alternative second inner surface 151

143 Plurality of concave valley segments disposed on the alterative second inner surface 151, wherein the plurality of concave valley segments 143 are numerically one more than the plurality of convex peaks 203

145 First end portion of the second surrounding sidewall 140

148 Alternative first end portion of the alternative second surrounding sidewall 141

146 Second end portion of the second surrounding sidewall 140

147 Alternative second end portion of the alternative second surrounding sidewall 141

150 Second inner surface of the second surrounding sidewall 140

151 Alternative second inner surface of the alternative second surrounding sidewall 141

155 Second outer surface of the second surrounding sidewall 140

156 Second base of the second surrounding sidewall 140

157 Inside surface of the second base 156

158 Outside surface of the second base 156

159 Second interior of the second surrounding sidewall 140

160 Second base 156 support for the tower 195 fluid communication structure 190

165 Pump/motor combination

166 Alternative second outer surface of the alternative second surrounding sidewall 141

167 Alternative second base of the alternative second surrounding sidewall 141

168 Alternative inside surface of the alternative second base 167

169 Alternative outside surface of the alternative second base 167

170 Fluid communication structure for pump and motor 165 suction within the first interior 125

171 Modified fluid communication structure for pump and motor 165 suction going from the first interior 125 or the alternative first interior 126 to the external environment 52 or outside of the first surrounding sidewall 95 or outside the alternative first surrounding sidewall 96

172 Alternative second interior of the alternative second surrounding sidewall 141

175 Inlet filter for the pump and motor 165 suction fluid communication 170 and 171

176 Pump and motor 165 discharge fluid communication structure within the first interior 125

177 Modified pump and motor 165 discharge fluid communication structure going from the external environment 52 or outside of the first surrounding sidewall 95 or outside the alternative first surrounding sidewall 96 to the first interior 125 or the alternative first interior 126

180 Secondary fluid communication structure from pump discharge 176, 177 to the spray nozzles 185

181 Alternative secondary fluid communication structure from pump discharge 176, 177 to the spray nozzle 185

182 Quasi Gerotor hydraulic pump

183 Inlet to the quasi Gerotor hydraulic pump 182

184 Outlet from the Gerotor hydraulic pump 182

185 Spray nozzle(s)

190 Primary fluid communication structure from pump discharge 176, 177 to tower structure 195 third interior 365

195 Tower structure

196 Rotation of the tower structure 195

200 Annular buoyant element

201 Alternative annular buoyant element

202 Plurality of concave recesses that are disposed upon the alternative outer periphery 206

203 Plurality of convex peaks that are disposed upon the alternative outer periphery 206, wherein the plurality of convex peaks 203 are numerically one less than the plurality of concave valley segments 143

205 Outer periphery of the annular buoyant element 200

206 Alternative outer periphery of the alternative annular buoyant element 201

210 Inner margin of the annular buoyant element 200

211 Alternative inner margin of the alternative annular buoyant element 201

215 Submerged side of the annular buoyant element 200

216 Alternative submerged side of the alternative annular buoyant element 201

220 Topside of the annular buoyant element 200

221 Alternative topside of the alternative annular buoyant element 201

225 Plurality of paddle extensions disposed on the outer periphery 205

226 Perpendicular radial fashion of the paddle extensions 225 in relation to the longitudinal axis 100

230 Annular extension disposed on the outer periphery 205 that is adjacent to the topside 220

231 Rotation of the annular buoyant element from rotational movement 65

232 Enhanced annular extension to cover the plurality of paddle extensions 225 or the plurality of concave recesses 202, the plurality of convex peaks 203, the plurality of convex segments 142, and the plurality of concave valley segments 143

235 Third surrounding sidewall of the tower structure 195

236 Rotation of the alternative annular buoyant element 201

240 Third proximal end portion of the third surrounding sidewall 235

241 Third termination margin of the third distal end portion 245

245 Third distal end portion of the third surrounding sidewall 235

250 Third mid portion of the third surrounding sidewall 235

255 Third inner surface of the third surrounding sidewall 235

260 Third outer surface of the third surrounding sidewall 235

265 Third interior of the third surrounding sidewall 235 as defined by the third inner surface 255, the cover inner surface 305, 306 and the topside 220, 221

270 Removably engageable nature of the third proximal end portion 240 to the topside 220 of the buoyant element 200

275 Drain aperture disposed therethrough the third proximal end portion 240 of the third surrounding sidewall 235

280 Plant aperture disposed therethrough the third mid portion 250 of the third surrounding sidewall 235

285 Annular support that is disposed within the third interior 265 adjacent to the third distal end portion 245 and affixed on its outer periphery 290 to the third inner surface 255, the annular support 285 having an annular inner periphery 295 that provides support for the tower 195 fluid communication structure 190

286 First surface of the annular support 285

287 Second surface of the annular support 285

290 Outer periphery of the annular support 285

295 Inner periphery of the annular support 295

296 Aperture disposed therethrough the annular support 285 from the annular support first surface 286 to the annular support second surface 287

297 Perpendicular support for the primary fluid communication structure 190 from the annular support 285 to the longitudinal axis 100

300 Cover having a cover outer surface 310 and an opposing cover inner surface 305, wherein the cover 300 is removably engageable to the third distal end portion 245 termination 241 such that the cover inner surface 305 is adjacent to the third inner surface 255 and the cover outer surface 310 adjacent to the third outer surface 260

301 Cover that is modified for the adjustable rotational friction bearing 320, the cover 301 includes a cover 301 outer surface 311 and an opposing cover inner surface 306, wherein the cover 301 is removably engageable to the third distal end portion 245 termination 241 such that the cover 301 inner surface 306 is adjacent to the third inner surface 255 and the cover 301 outer surface 311 adjacent to the third outer surface 260

302 Aperture of cover 301

305 Inner surface of the cover 300

306 Inner surface of the cover 301

307 Removably engageable structure of the cover 300 to the third termination margin 241 that can be but not limited to threads, slip fit, snap fit, and the like.

310 Outer surface of the cover 300

311 Outer surface of the cover 301

315 Flow control valve on the fluid communication structure 190

320 Adjustable rotational friction bearing as between the cover outer surface 311 and the manually selectable friction tightening nut 330 and friction washer 335

325 Selectable timed power switch for the pump motor combination 165

330 Manually selectable friction tightening nut

331 Tightening/loosening rotation of the nut 330

335 Friction washer

340 Threaded stud for the friction tightening nut 330

345 Threaded retainer for affixing the threaded stud 340 to the primary fluid communication structure 190

350 Aperture of the primary fluid communication structure 190 to facilitate pressure movement 70 and gravity flow 76 of the nutrient rich fluid 55 around the threaded stud 340 and threaded retainer 345

355 Variable clamping force as between the friction washer 335 that is between the friction nut 330 and the modified cover 301 outer surface 311

With initial reference to FIG. 1 shown is an upper perspective view of the rotating planter apparatus 50 that includes the first surrounding sidewall 95 resting upon the surface 54 with the first base 130, the rotating 196 assembly including the third surrounding sidewall 235, the cover 300, and the plant apertures 280 disposed within the third surrounding sidewall 235 that have the plants 51 disposed with the plant apertures 280, further the light source 53 is shown, that is usually fixed in position with the rotating 196 third surrounding sidewall 235 facilitating the light source 53 reaching all of the plants 51 on a selected time basis.

Figure 2:
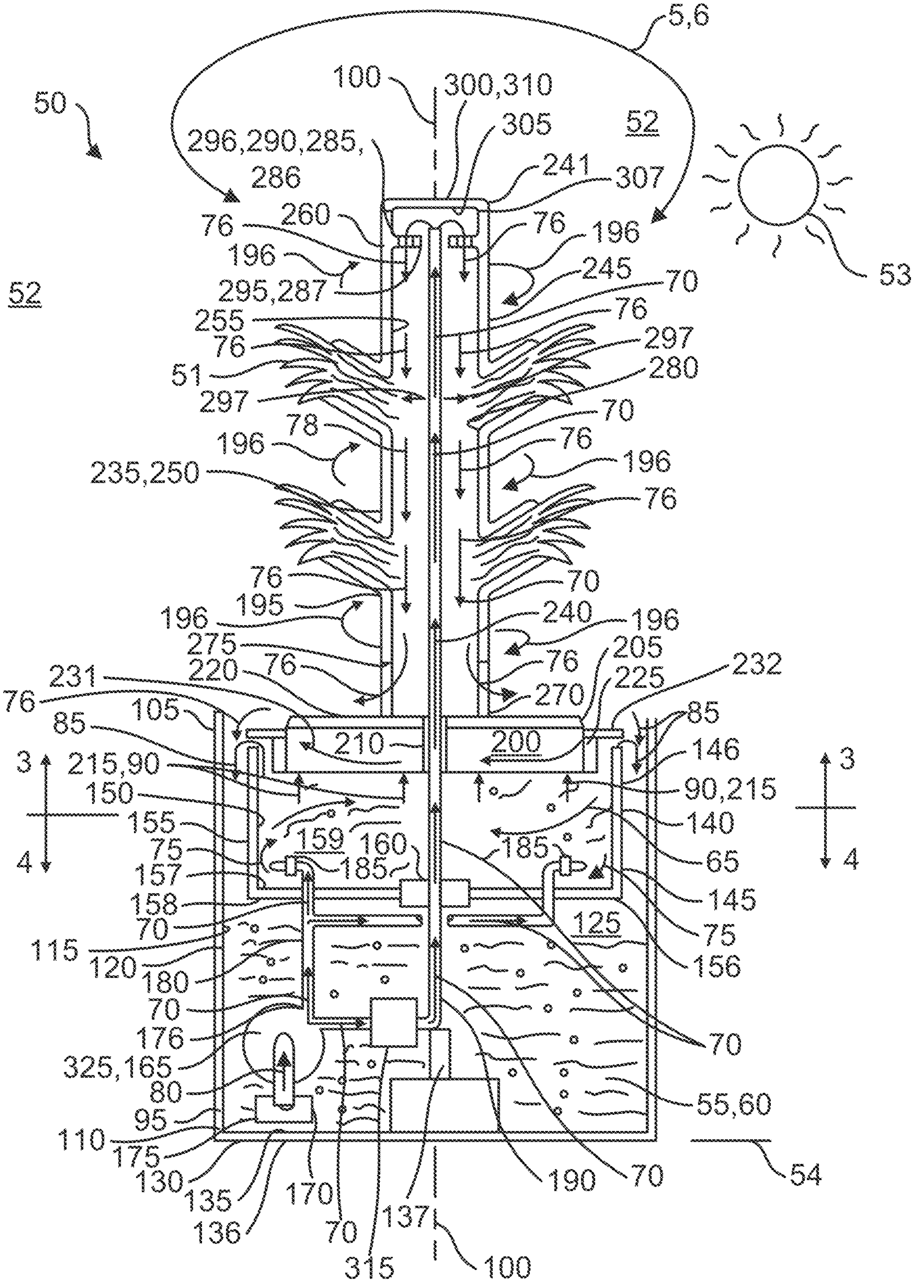

Continuing, FIG. 2 shows a side elevation view of the rotating planter apparatus 50 as shown in FIG. 1, wherein FIG. 2 is a full cross section of the rotating planter apparatus 50 that includes the first surrounding sidewall 95 that contains the nutrient rich fluid 55 with the pump/motor combination 165 disposed in the nutrient rich fluid 55 in the first interior 125, further shown is the second surrounding sidewall 140 and second base 156 that is supported by the primary fluid communication structure 190, a portion of the pump 165 discharge creates through jet spray nozzles 75 a rotating fluid 65 within the second interior 159 that in turn drive the annular buoyant element 200 via paddle extensions 225 that in turn rotating the third surrounding sidewall 235 that is supported by the annular buoyant element 200 that not only rotates the plants 51 disposed within the plant apertures 280 for more even light source 53 exposure, but also utilizes a remaining portion of the pump 165 output to water the plants 51 through gravity flow 76 of the nutrient rich fluid 55 down through the third surrounding sidewall 235 third interior 265.

Figure 3:
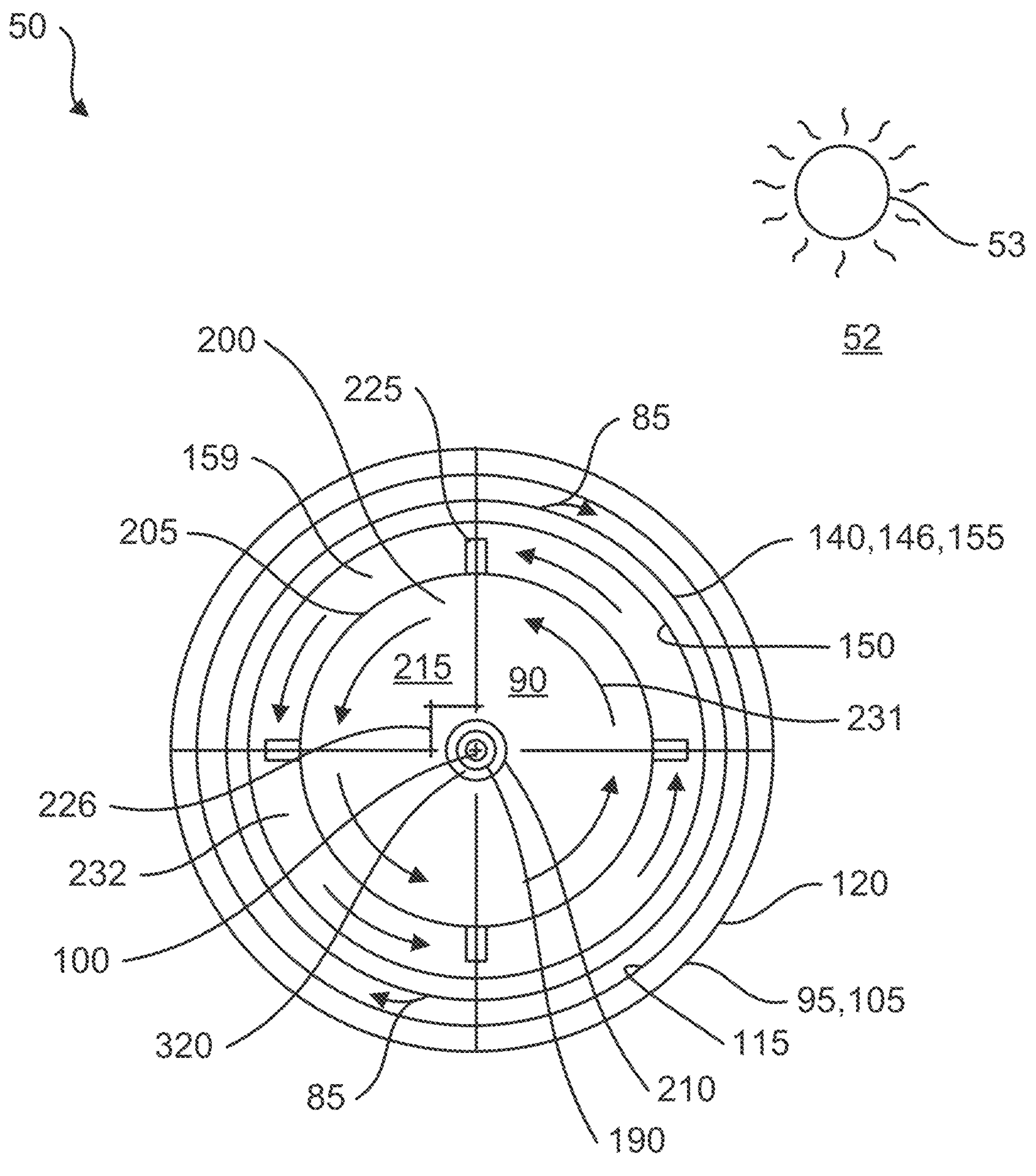

Next, FIG. 3 shows a cross section cut 3-3 from FIG. 2, wherein FIG. 3 shows the annular buoyant element 200 with the paddle extensions 225 from the submerged side 215 also showing rotation 231 of the annular buoyant element 200.

Figure 4:
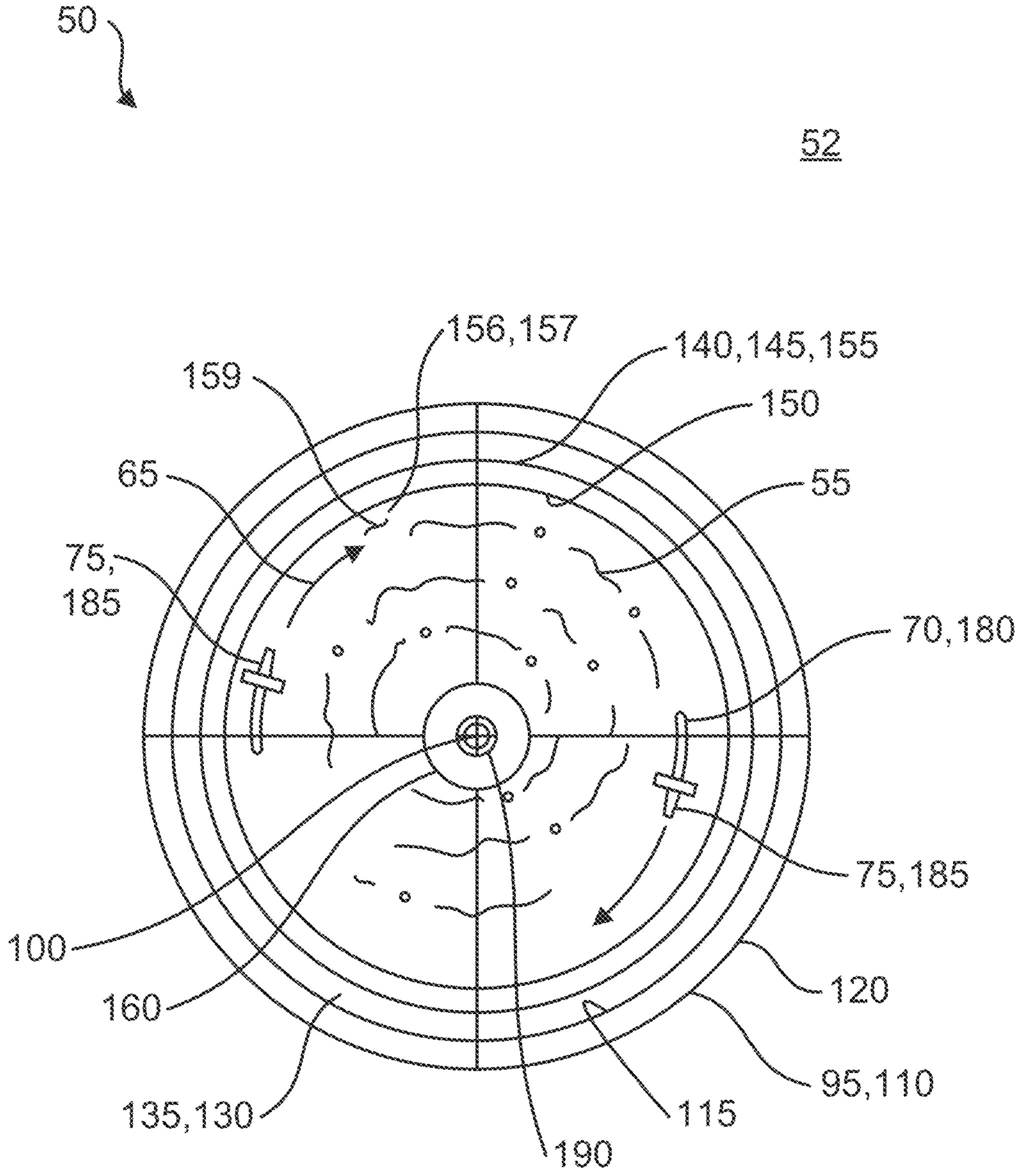

Further, FIG. 4 shows a cross section cut 4-4 from FIG. 2, wherein FIG. 4 shows the second surrounding sidewall 140 second interior 159 with the spray nozzles 185 showing the circular circulation 65 of the nutrient rich fluid 55 from a portion of the pump 165 output.

Figure 5:
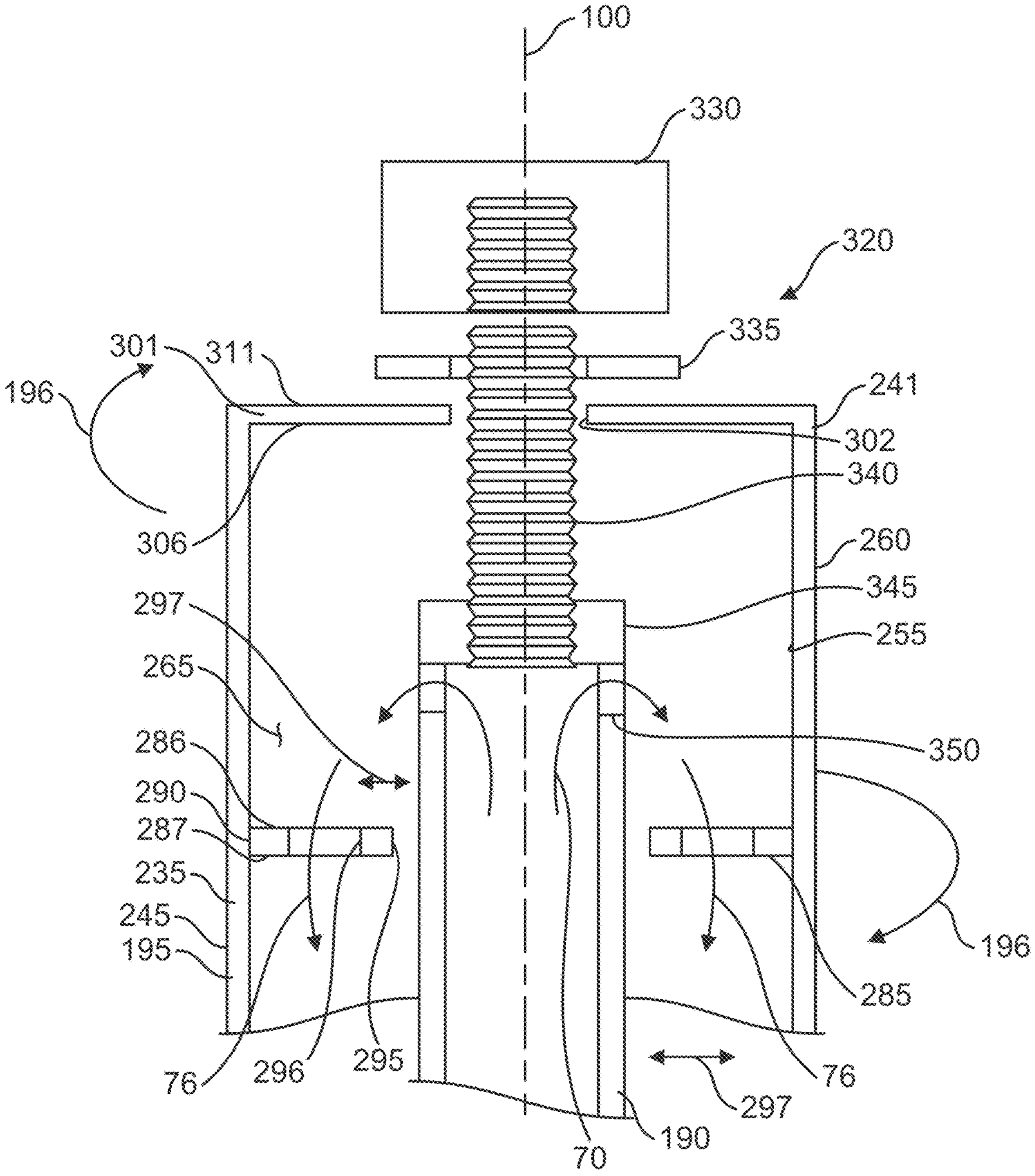
FIG. 5 shows view 5 from FIG. 2 of the third surrounding sidewall distal end portion, wherein FIG. 5 details out the adjustable rotational bearing that is to create rotational friction to adjustably control rotational speed of the third surrounding sidewall from the varying nut compressive friction upon the friction washer utilizing the threaded stud that is affixed to the threaded retainer disposed on the primary fluid communication structure, with a constant pump output to the spray nozzles which in turn exerts a constant rotational force to the paddle extensions of the annular buoyant element, wherein the nut and friction washer are shown in the uncompressed state.

In addition, FIG. 5 shows view 5 from FIG. 2 of the third surrounding sidewall 235 distal end portion 245, wherein FIG. 5 details out the adjustable rotational bearing 320 that is to create rotational 196 friction to adjustably control rotational 196 speed of the third surrounding sidewall 235 from the varying nut 330 compressive friction 355 upon the friction washer 335 utilizing the threaded stud 340 that is affixed to the threaded retainer 345 disposed on the primary fluid communication structure 190, with a constant pump 165 output to the spray nozzles 185 which in turn exerts a constant rotational force 65 to the paddle extensions 225 of the annular buoyant element 200, wherein the nut 330 and friction washer 335 are shown in the uncompressed state.

Figure 6:
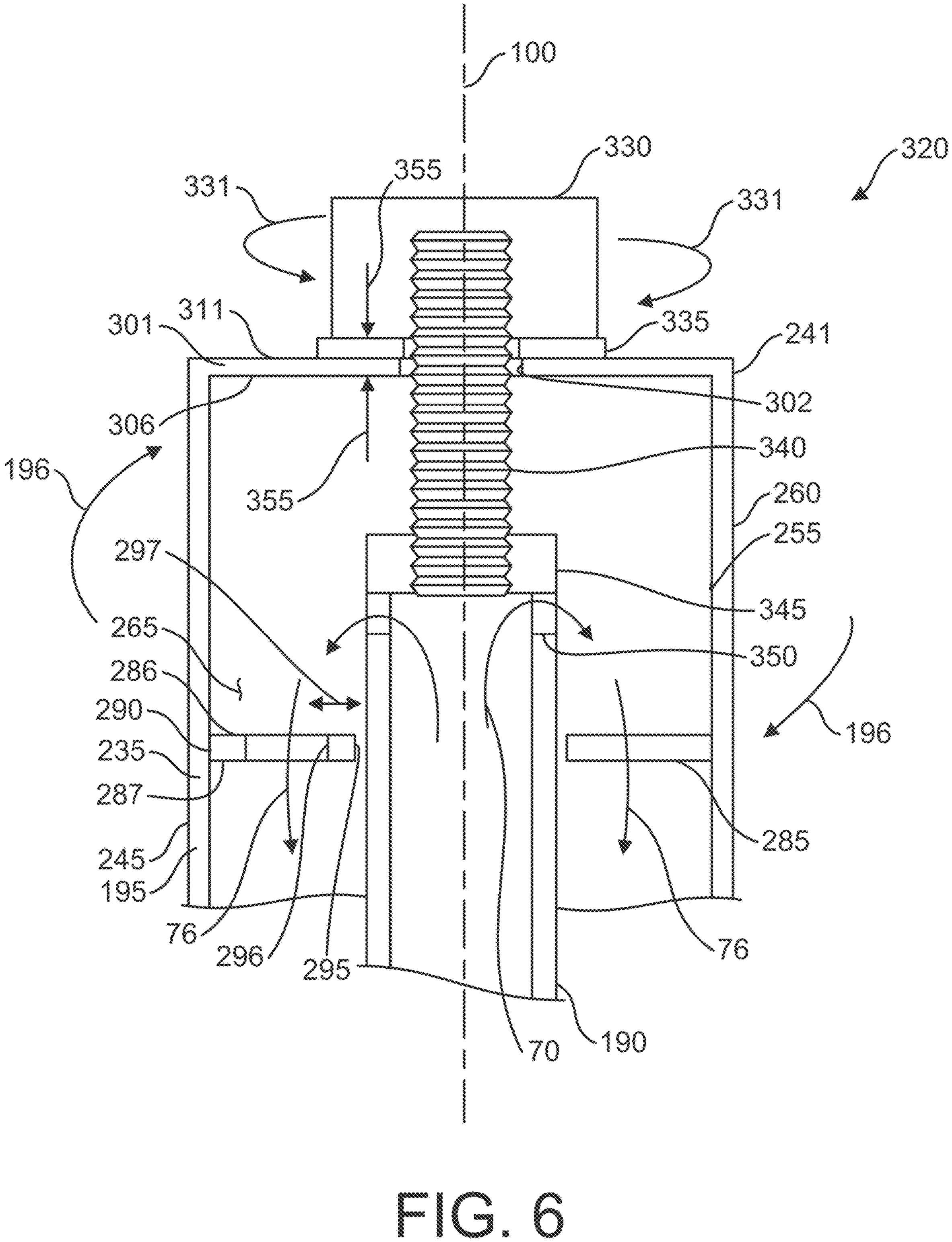
FIG. 6 shows view 6 from FIG. 2 of the third surrounding sidewall distal end portion, wherein FIG. 6 details out the adjustable rotational bearing that is to create rotational friction to adjustably control rotational speed of the third surrounding sidewall from the varying nut compressive friction upon the friction washer utilizing the threaded stud that is affixed to the threaded retainer disposed on the primary fluid communication structure, with a constant pump output to the spray nozzles which in turn exerts a constant rotational force to the paddle extensions of the annular buoyant element, wherein the nut and friction washer are shown in the compressed state thus providing selectable rotational frictional resistance to the third surrounding sidewall from the rotational energy of the buoyant paddle extensions.

Next, FIG. 6 shows view 6 from FIG. 2 of the third surrounding sidewall 235 distal end portion 245, wherein FIG. 6 details out the adjustable rotational bearing 320 that is to create rotational friction 196 to adjustably control rotational 196 speed of the third surrounding sidewall 235 from the varying nut 330 compressive friction 355 upon the friction washer 335 utilizing the threaded stud 340 that is affixed to the threaded retainer 345 disposed on the primary fluid communication structure 190, with a constant pump 165 output to the spray nozzles 185 which in turn exerts a constant rotational force 65 to the paddle extensions 225 of the annular buoyant element 200, wherein the nut 330 and friction washer 335 are shown in the compressed state 355 thus providing selectable rotational frictional resistance 330, 331 to the third surrounding sidewall 235.

Figure 7:
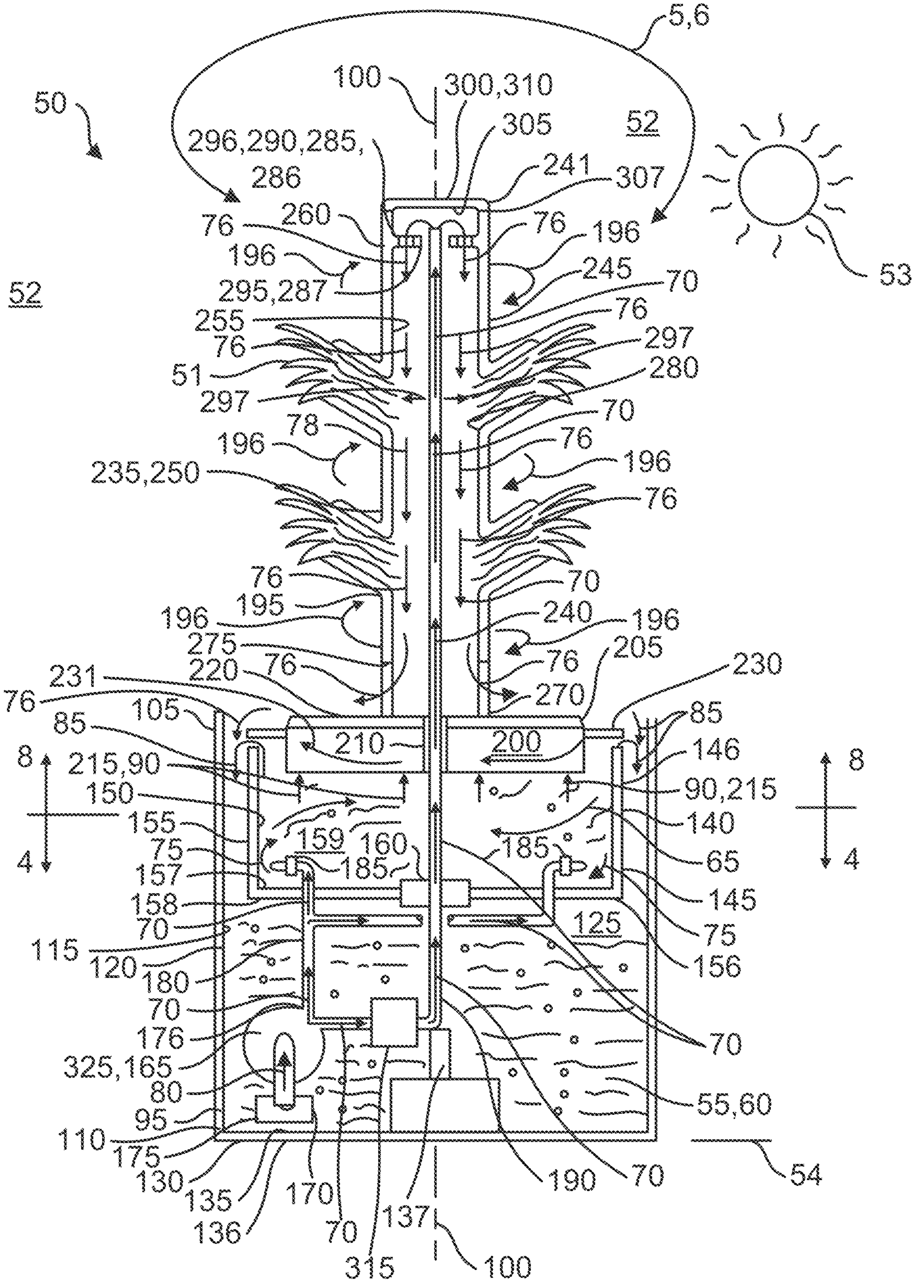

Continuing, FIG. 7 shows a side elevation view of the rotating planter apparatus 50 as shown in FIG. 1, wherein FIG. 7 is a full cross section of the rotating planter apparatus 50 that includes the first surrounding sidewall 95 that contains the nutrient rich fluid 55 with the pump/motor combination 165 disposed in the nutrient rich fluid 55 in the first interior 125, further shown is the second surrounding sidewall 140 and second base 156 that is supported by the primary fluid communication structure 190, a portion of the pump 165 discharge creates through jet spray nozzles 75 a rotating fluid 65 within the second interior 159 that in turn drive the annular buoyant element 200 without the paddle extensions 225 that in turn rotating the third surrounding sidewall 235 that is supported by the annular buoyant element 200 that not only rotates the plants 51 disposed within the plant apertures 280 for more even light source 53 exposure, but also utilizes a remaining portion of the pump 165 output to water the plants 51 through gravity flow 76 of the nutrient rich fluid 55 down through the third surrounding sidewall 235 third interior 265.

Figure 8:
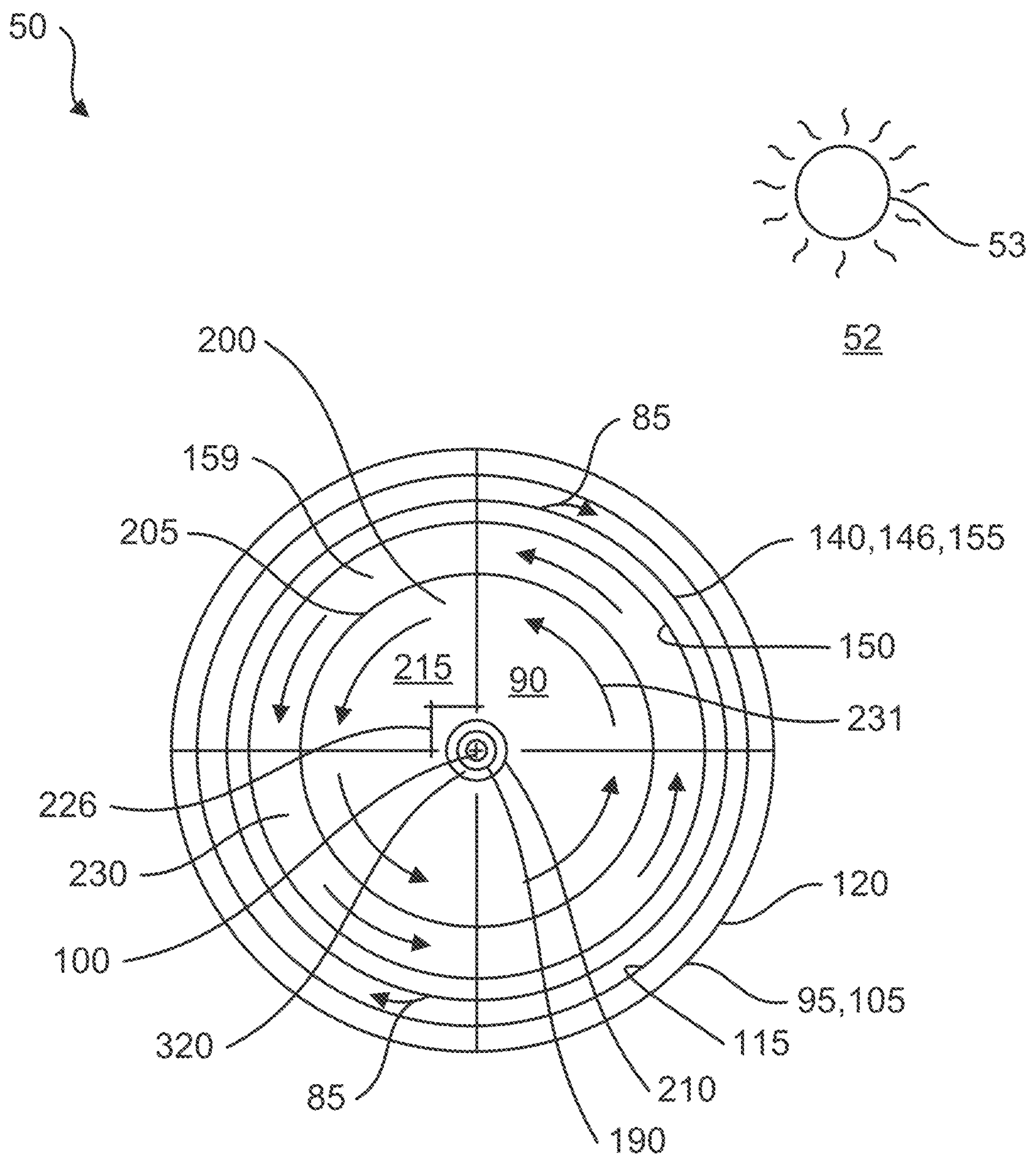

Next, FIG. 8 shows a cross section cut 8-8 from FIG. 7, wherein FIG. 8 shows the annular buoyant element 200 without the paddle extensions 225 from the submerged side 215 also showing rotation 231 of the annular buoyant element 200.

Figure 9:
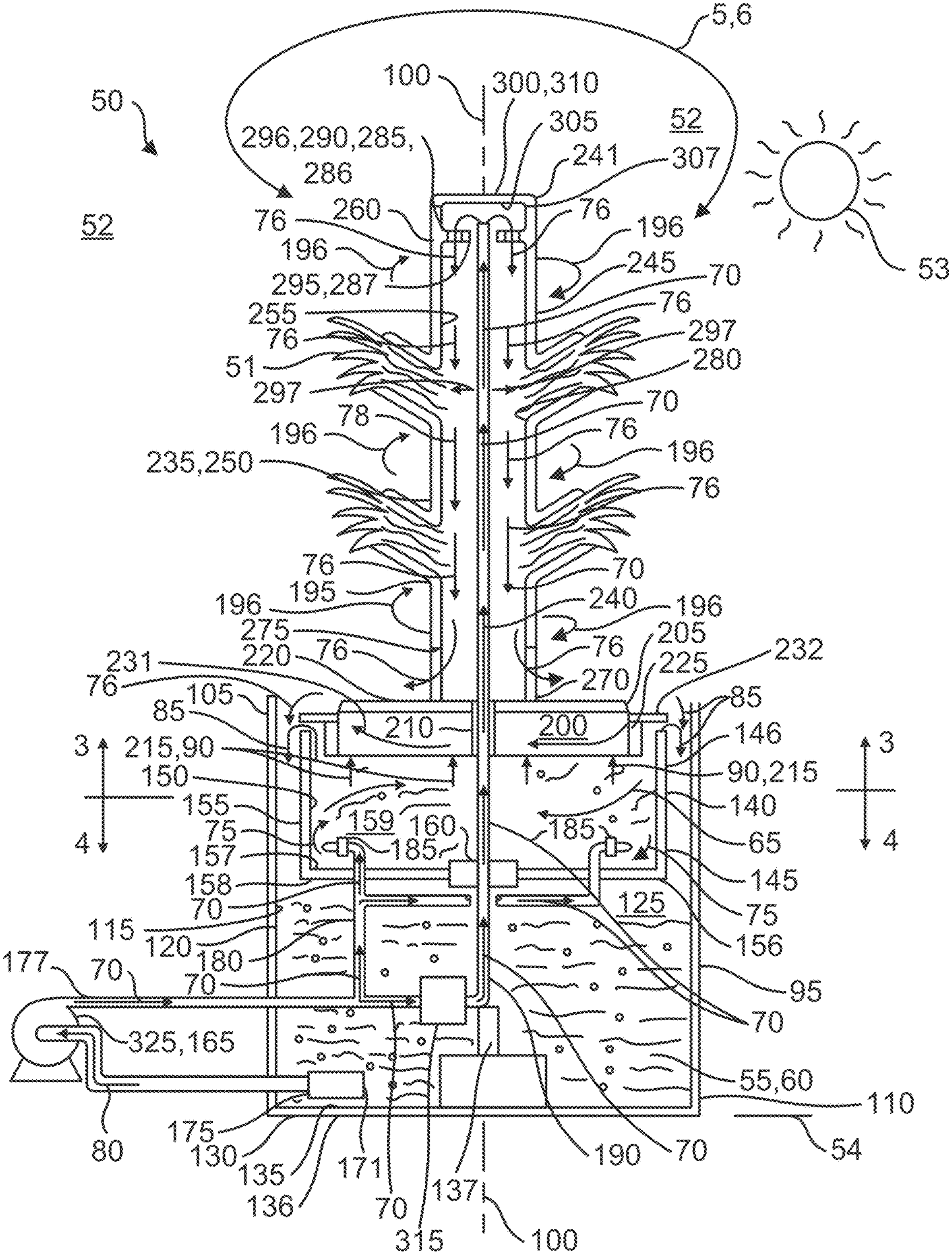

Continuing, FIG. 9 shows a side elevation view of the rotating planter apparatus 50 as shown in FIG. 1, wherein FIG. 9 is a full cross section of the rotating planter apparatus 50 that includes the first surrounding sidewall 95 that contains the nutrient rich fluid 55 with the pump/motor combination 165 disposed external to the first surrounding sidewall 95 in the external environment 52 being in suction 170 and discharge 176 fluid communication structures with the nutrient rich fluid 55 that is disposed within the first interior 125. Further shown in FIG. 9 is the second surrounding sidewall 140 and second base 156 that is supported by the primary fluid communication structure 190, a portion of the pump 165 discharge creates through jet spray nozzles 75 a rotating fluid 65 within the second interior 159 that in turn drive the annular buoyant element 200 via paddle extensions 225 that in turn rotating the third surrounding sidewall 235 that is supported by the annular buoyant element 200 that not only rotates the plants 51 disposed within the plant apertures 280 for more even light source 53 exposure, but also utilizes a remaining portion of the pump 165 output to water the plants 51 through gravity flow 76 of the nutrient rich fluid 55 down through the third surrounding sidewall 235 third interior 265. Note that FIG. 9 can also apply to the alternative embodiment of the rotating planter apparatus 56 as shown in FIGS. 10 and 11, in that the pump and motor 165 combination can be disposed external to the first surrounding sidewall 95 in the external environment 52 as described above.

Figure 10:
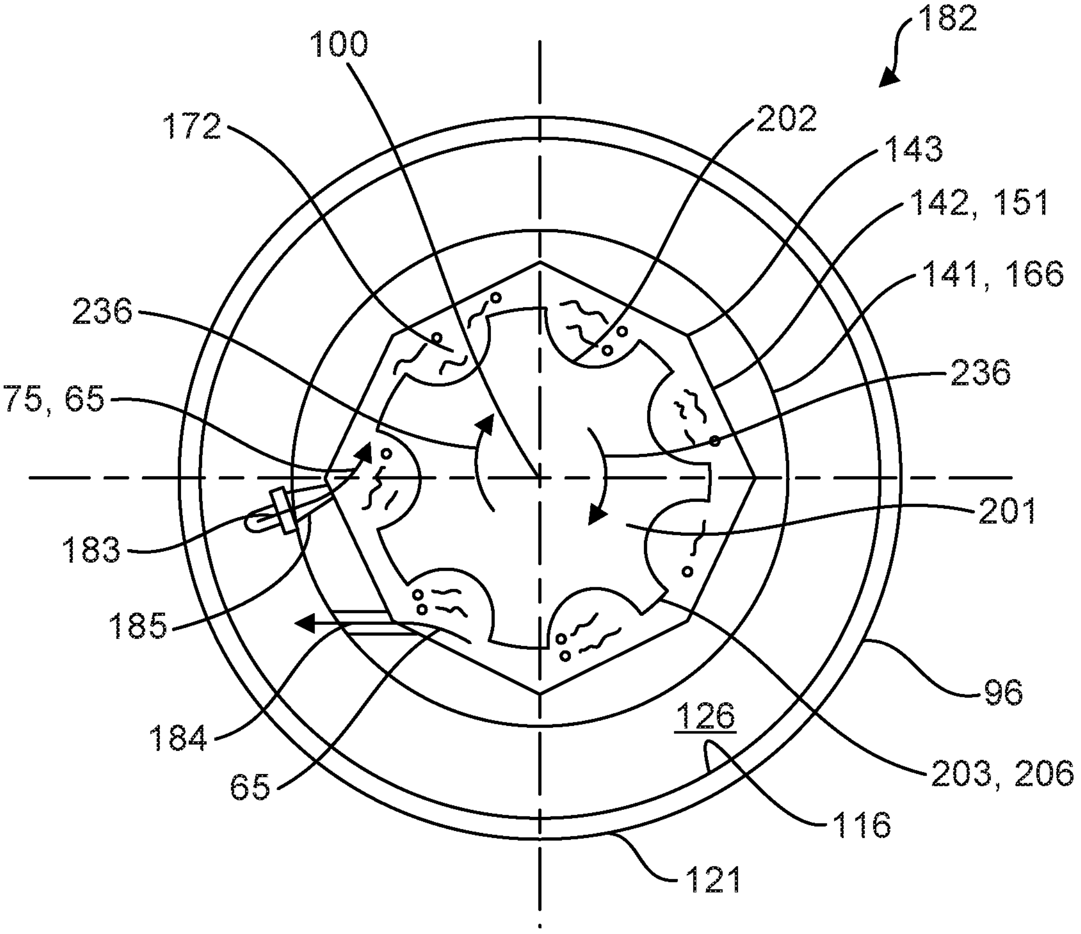
Figure 11:
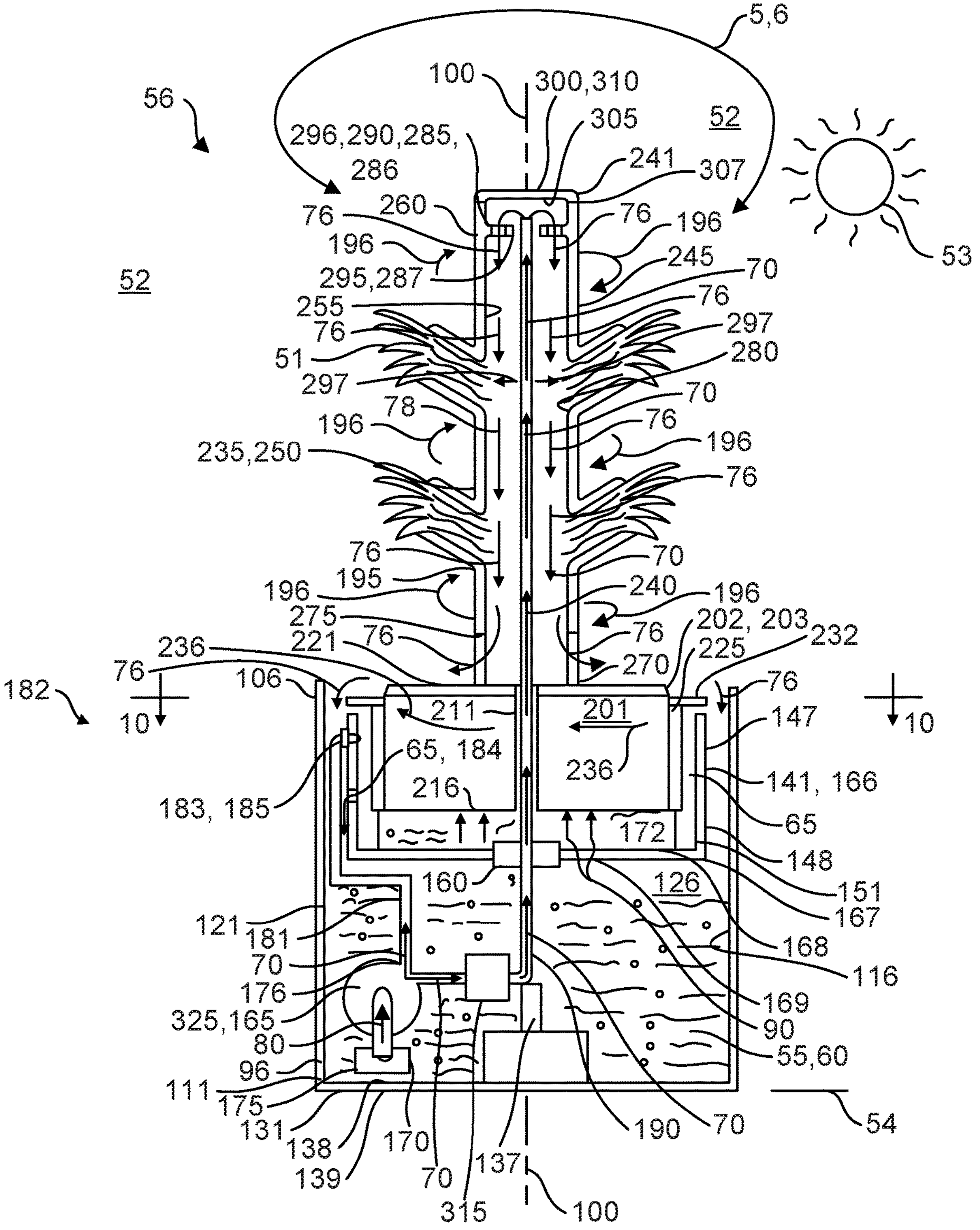

Further, FIG. 10 is cross section view 10-10 from FIG. 11, wherein FIG. 10 shows the quasi Gerotor hydraulic pump 182 that includes the alternative first surrounding sidewall 96, the alternative first surrounding sidewall interior 126, the alternative second surrounding sidewall 141 that is disposed within the alternative first surrounding sidewall interior 126, the alternative second inner surface 151 that includes the plurality of adjacent convex segments 142, the plurality of concave valleys 143 that are each disposed in-between the plurality of adjacent convex segments 142 forming a continuous surface, the alternative second interior 172, and the alternative buoyant element 210 having an outer periphery that includes a plurality of concave recesses 202 that are each separated by a plurality of convex peaks 203. As shown in FIG. 10 the total number of convex peaks 203 is one less than the total number of concave valleys 143, further included is a pressurized inlet flow 183, 185, 75 into the alternative second interior 172 and an outlet flow 184 from the alternative second interior 172 to the alternative first interior 126 resulting in a circular flow 65 of the nutrient rich fluid 55 about the longitudinal axis 100 within the alternative second interior 172 that in turn causes the alternative buoyant element 201 to rotate 236 about the longitudinal axis 100.

Continuing, FIG. 11 shows a side elevation view of the alternative rotating planter apparatus 56 basically as shown in FIG. 1, wherein FIG. 11 is a full cross section of the alternative rotating planter apparatus 56 that includes the alternative first surrounding sidewall 96 that contains the nutrient rich fluid 55 with the pump/motor combination 165 disposed in the nutrient rich fluid 55 in the alternative first interior 126, further shown is the alternative second surrounding sidewall 141 and the alternative second base 167 that is supported by the primary fluid communication structure 190, a portion of the pump 165 discharge is routed through the alternative secondary fluid communication structure 181 that through the jet nozzle 185 discharges a rotating fluid 65 within the alternative second interior 172 at the inlet 183 that in turn drives the alternative annular buoyant element 201 via the plurality of concave recesses 202 and the plurality of convex peaks 203 in conjunction with the plurality of convex segments 142 and plurality of concave valleys 143 within the alternative second interior 172 to rotate the alternative annular buoyant element 201 and the third surrounding sidewall 235 that is supported by the alternative annular buoyant element 201 via buoyancy 216, 90 of the nutrient rich fluid 55 disposed within the alternative second interior 172, that not only rotates 236, 196 the third surrounding sidewall 235 with the plants 51 disposed within the plant apertures 280 about the longitudinal axis 100 for more even light source 53 exposure, but also utilizes a remaining portion of the pump 165 output 70 to water the plants 51 through gravity flow 76 of the nutrient rich fluid 55 down through the third surrounding sidewall 235 third interior 265.

Broadly in looking at FIGS. 1 to 11, the present invention is the rotating planter apparatus 50 that is in the form of the vertical planter 50 that is disposed upon the resting surface 54 and placed into the environment 52 utilizing the external light source 53, the rotating planter apparatus 50 including the first surrounding sidewall 95 that is about a longitudinal axis 100, the first surrounding sidewall 95 having a first distal end portion 105 and an opposing first proximal end portion 110 with the longitudinal axis 100 spanning therebetween, the first surrounding sidewall 95 further including a first inner surface 115 and an opposing first outer surface 120. Further, the first base 130 that is affixed to the first proximal end portion 110 of the first surrounding sidewall 95, the first base 130 includes a first base inside surface 135 and an opposing first base outside surface 136, wherein the first base outside surface 136 is adjacent to the resting surface 54, for the first base 130 to support 137 the tower 195, the first surrounding sidewall 95 further including a first interior 125 defined by the first inner surface 115 and the first inside surface 135. Also included is a second surrounding sidewall 140 that is about the longitudinal axis 100, the second surrounding sidewall 140 having a first end portion 145 and an opposing second end portion 146 with the longitudinal axis 100 spanning therebetween, the second surrounding sidewall 140 further including a second inner surface 150 and an opposing second outer surface 155, see FIGS. 2 and 4.

Also included is a second base 156 that is affixed to the first end portion 145 of the second surrounding sidewall 140, the second base 156 includes a second base inside surface 157 and an opposing second base outside surface 158, the second surrounding sidewall 140 further including a second interior 159 defined by the second inner surface 150 and the second base inside surface 157. In addition, an annular buoyant element 200 that is about the longitudinal axis 100, the annular buoyant element 200 includes an outer periphery 205 that is about the longitudinal axis 100 and an opposing inner margin 210 that is about the longitudinal axis 100, further the annular buoyant element 200 includes a submerged side 215 and an opposing top side 220, wherein the submerged side 215 and the top side 220 are both positioned perpendicular to the longitudinal axis 100, wherein the submerged side 215 is disposed within the second interior 159, see FIGS. 7 and 8.

Plus, looking at FIGS. 1, 2, 5, 6, 7, 9, and 11, a tower structure 195 that is constructed from the third surrounding sidewall 235 that is about the longitudinal axis 100, the third surrounding sidewall 235 includes a third proximal end portion 240 and an opposing third distal end portion 245 with a third mid portion 250 therebetween, with the longitudinal axis 100 spanning therebetween the third proximal end portion 240, the third mid portion 250, and the third distal end portion 245, the third surrounding sidewall 235 further includes a third inner surface 255 and an opposing third outer surface 260, the third distal end portion 245 terminating in a third margin 241, the third surrounding sidewall 235 further includes a drain aperture 275 disposed therethrough from the third outer surface 260 to the third inner surface 255 in the third proximal end portion 240 and a plant aperture 280 disposed therethrough from the third outer surface 260 to the third inner surface 255 in the third mid portion 250, the third proximal end portion 240 is removably engaged 270 to the topside 220 of the buoyant element 200. Further, a cover 300 having a cover outer surface 310 and an opposing cover inner surface 305, the cover 300 is removably engageable 307 to the third distal end portion 245 third margin 241, the third surrounding sidewall 235 having a third interior 265 defined by the third inner surface 255, the cover inner surface 305, 306, and the topside 220. Plus, a pump and motor combination 165 with a suction fluid communication structure 170, and modified suction fluid communication structure 171 that is in fluid communication 80 with the first interior 125, the pump and motor combination 165 further includes a discharge fluid communication structure 176, and modified discharge fluid communication structure 177. Also, a primary fluid communication structure 190 from the discharge fluid communication structure 176, 177 to the tower structure third interior 265, see FIGS. 1 to 9.

In addition, a secondary fluid communication structure 180 from the discharge fluid communication structure 176, 177 to a spray nozzle 185 that is disposed within the second interior 159. Wherein operationally, the nutrient rich fluid 55 is disposed within the first interior 125, wherein the pump and motor combination 165 creates a pressure movement flow 70 of the nutrient rich fluid 55 from the suction fluid communication structure 170, and modified suction fluid communication structure 171 to the discharge fluid communication structure 176, and modified discharge fluid communication structure 177 and onward to the primary fluid communication structure 190 to discharge the nutrient rich fluid 55 into the third interior 265, also further the discharge fluid communication structure 176, 177 discharges the nutrient rich fluid 55 through the secondary fluid communication structure 180 to the spray nozzle 185 to create a rotational movement 65 of the nutrient rich fluid 55 within the second interior 159 to contact the outer periphery 205 and the submerged side 215 to rotate the annular buoyant element 231 that is resting on a buoyancy force 90 and to support the tower structure 195 that is in rotational lockstep with the annular buoyant element 200. This resulting in having rotation 196 of the tower structure 235 to provide the nutrient rich fluid 55 to a plant 51 disposed within the plant aperture 280 and to provide selectable exposure to the light source 53 through the tower structure 235 rotation 196 about the longitudinal axis 100, see FIGS. 1, 2, 5, 6, 7, 9, and 11.

As an option for the rotating planter apparatus 50, it can further comprise a flow control valve 315 that is disposed on the primary fluid communication structure 190 from the discharge fluid communication structure 176, and modified discharge fluid communication structure 177 to the tower structure 195 third interior 265, wherein operationally the flow control valve 315 provides for selectable intermittent flow 70 from the pump and motor combination 165 to the tower structure 195 third interior 265 to accommodate an intermittent plant 51 hydration schedule, see FIGS. 2, 7, 9, and 11.

As another option for the rotating planter apparatus 50, it can further comprise a selectably adjustable friction rotational bearing 320 that is disposed adjacent to a modified cover 301 outer surface 311 that includes a modified cover aperture 302, a friction nut 330, a threaded stud 340 that is threadbly affixed to a retainer 345 that is affixed to the primary fluid communication 190, wherein the friction nut 330 threaded stud 340 is disposed therethrough the modified cover 301 aperture 302, further a friction washer 335 is disposed adjacent to the modified cover 301 outer surface 311 and disposed about the friction nut 330 threaded stud 340, wherein a manually selectable friction tightening nut 330 is threadably engaged to the friction nut 330 threaded stud 340 to operationally create a variable clamping force 355 to sandwich the friction washer 335 between the friction nut 330 and the modified cover 301 outer surface 311. Wherein operationally, the selectably adjustable friction rotational bearing 320 is to control a rotational speed 196 of the annular buoyant element 200, 201 and the tower structure 195 to selectably adjust an amount of the external light source 53 exposure to the plant 51, see in particular FIGS. 5 and 6, plus FIGS. 1 and 2, and FIGS. 7 to 11.

As a further option for the rotating planter apparatus 50, it can further comprise a selectably adjustable power switch 325 for the pump and motor combination 165 to operationally deactivate the pump and motor combination 165 to stop the plant 51 hydration 55 and to stop the tower structure 195 rotation 196, see FIGS. 2 to 9, and 11.

A continuing option for the rotating planter apparatus 50, it can further comprise a first base support 137 that is disposed between the first inside surface 135 of the first base 130 and the primary communication structure 190 to operationally give vertical support to the primary fluid communication structure 190, see FIGS. 2, 7, 9, and 11.

Another continuing option for the rotating planter apparatus 50, it can further comprise a second base support 160 that is disposed between the second base 156 and the primary fluid communication structure 190 to operationally give vertical support to the primary fluid communication structure 190, see FIGS. 2, 7, 9, and 11.

Yet another continuing option for the rotating planter apparatus 50, it can further comprise an annular support 285 that has an annular support 285 outer periphery 290 and an annular support 285 inner periphery 295, wherein the annular support 285 outer periphery 290 is affixed to the third inner surface 255 resulting in the annular support 285 being disposed within the third interior 265 and positioned adjacent to the third distal end portion 245, the annular support 285 inner periphery 295 having a slip fit rotational engagement to the primary fluid communication structure 190 to operationally provide support perpendicular 297 to the longitudinal axis 100 for the primary fluid communication structure 190 while accommodating the tower structure 195 to rotation 196 about the primary fluid communication structure 190. The annular support 285 further includes an annular support first surface 286 and an opposing annular support second surface 287 with an aperture 296 disposed therebetween to facilitate a gravity flow 76 of the nutrient rich fluid 55 to the plant 51 within the third interior 265 from the pressure movement flow 70 of the nutrient rich fluid 55 within the primary fluid communication structure 190, see FIGS. 2, 7, 9, and 11.

A further continuing option for the rotating planter apparatus 50, it can further comprise an annular extension 230 that is disposed on the outer periphery 205 that is positioned radially outward of the outer periphery 205 and the top side 220, the annular extension 230 extends outward from the longitudinal axis 100 beyond the second interior 159 outward from the longitudinal axis 100, to operationally help divert the gravity flow 76 of the nutrient rich fluid 55 away from the second interior 159 to lessen interference from the gravity flow 76 of the nutrient rich fluid 55 to the spray nozzle 185 velocity 75 of the nutrient rich fluid 55, see FIGS. 7 and 8.

Another option for the rotating planter apparatus 50, it can further comprise a plurality of paddle extensions 225 that are disposed on the outer periphery 205 that each extend outward in a perpendicular radial fashion 226 from the longitudinal axis 100, the plurality of paddle extensions 225 further enhance the rotation 196 of the tower structure 195 from the spray nozzle 185 discharge velocity 75 of the nutrient rich fluid 55, see FIGS. 2, 3, and 9.

A further continuing option for the rotating planter apparatus 50, as it can further compromise an enhanced annular extension 232 that is disposed on the outer periphery 205 that is positioned to cover the plurality of paddle extensions 225 and the top side 220, the enhanced annular extension 232 extends outward from the longitudinal axis 100 beyond the plurality of paddle extensions 225 to operationally help divert the gravity flow 76 of the nutrient rich fluid 55 away from the plurality of paddle extensions 225 to lessen interference from the gravity flow 76 of the nutrient rich fluid 55 to the spray nozzle 185 velocity 75 of the nutrient rich fluid 55, see FIGS. 2, 3, and 9.

Another alternative for the rotating planter apparatus 50, wherein the pump and motor combination 165 is disposed within the first interior 125 with a suction fluid communication structure 170 that is completely disposed within the first interior 125 and a discharge fluid communication structure 176 that is completely disposed within the first interior 125, see FIGS. 2 and 7.

A further alternative for the rotating planter apparatus 50, wherein the pump and motor combination 165 is disposed within the external environment 52 with the modified suction fluid communication structure 171 that is in communication from the first interior 125 to the external environment 52 and the modified discharge fluid communication structure 177 in communication from the external environment 52 to said first interior 125, see FIG. 9.

Looking at FIGS. 10 and 11 in particular, an alternative embodiment of the rotating planter apparatus 56 that is in the form of a vertical planter that is disposed upon a resting surface 54 and placed into an environment 52 utilizing an external light source 53, the alternative rotating planter apparatus 56 including an alternative first surrounding sidewall 96 that is about a longitudinal axis 100, the alternative first surrounding sidewall 96 having an alternative first distal end portion 106 and an opposing alternative first proximal end portion 111 with the longitudinal axis 100 spanning therebetween, the alternative first surrounding sidewall 96 further including an alternative first inner surface 116 and an opposing alternative first outer surface 121.

Also included for the alternative embodiment of the rotating planter apparatus 56 is an alternative first base 131 that is affixed to the alternative first proximal end portion 111 of the alternative first surrounding sidewall 96, the alternative first base 131 includes an alternative first base inside surface 138 and an opposing alternative first base outside surface 139, wherein the alternative first base outside surface 139 is adjacent to the resting surface 54, the alternative first surrounding sidewall 96 further including an alternative first interior 126 defined by the alternative first inner surface 116 and the alternative first base inside surface 138. Also included is an alternative second surrounding sidewall 141 that is about the longitudinal axis 100, the alternative second surrounding sidewall 141 having an alternative first end portion 148 and an opposing alternate second end portion 147 with the longitudinal axis 100 spanning therebetween, the alternative second surrounding sidewall 141 further including an alternative second inner surface 151 and an opposing alternative second outer surface 166, the alternative second inner surface 151 is constructed of a plurality of adjacent convex segments 142 that are each separated by a concave valley segment 143 forming a continuous surface, wherein the plurality of convex segments 142 and concave valley segments 143 are about the longitudinal axis 100.

Further included is an alternative second base 167 that is affixed to the alternative first end portion 146 148 of the alternative second surrounding sidewall 141, the alternative second base 167 includes an alternative second base inside surface 168 and an opposing alternative second base outside surface 169, the alternative second surrounding sidewall 141 further including an alternative second interior 172 defined by the alternative second inner surface 151 and the alternative second base inside surface 168. Additionally included, is an alternative annular buoyant element 201 that is about the longitudinal axis 100, the alternative annular buoyant element 201 includes an alternative outer periphery 206 that is about the longitudinal axis 100 and an opposing alternative inner margin 211 that is about the longitudinal axis 100, further the alternative annular buoyant element 201 includes an alternative submerged side 216 and an alternative opposing top side 221, wherein the alternative submerged side 216 and the alternative top side 221 are both positioned perpendicular to the longitudinal axis 100, wherein the alternative submerged side 216 is disposed within the alternative second interior 172, wherein the alternative outer periphery 206 is constructed of a plurality of adjacent concave recesses 202 that are each separated by a convex peak 203, resulting in a plurality of concave recesses 202 and a plurality of convex peaks 203 forming a continuous surface, wherein the plurality of convex peaks 203 are numerically one less than the plurality of the concave valley segments 143, wherein an alternative second interior 172 is formed between the alternative outer periphery 206 and the alternative second inner surface 151, further the alternative annular buoyant element 201, the alternative second interior 172, and the alternative second surrounding sidewall 141 form a quasi Gerotor hydraulic motor.

Another addition is the tower structure 195 that is constructed from a third surrounding sidewall 235 that is about the longitudinal axis 100, the third surrounding sidewall 235 includes a third proximal end portion 240 and an opposing third distal end portion 245 with a third mid portion 250 therebetween, with the longitudinal axis 100 spanning therebetween the third proximal end portion 240, the third mid portion 250, and the third distal end portion 245, the third surrounding sidewall 235 further includes a third inner surface 255 and an opposing third outer surface 260, the third distal end portion 245 terminating in a third termination margin 241, the third surrounding sidewall 235 further includes a drain aperture 275 disposed therethrough from the third outer surface 260 to the third inner surface 255 in the third proximal end portion 240 and a plant aperture 280 disposed therethrough from the third outer surface 260 to the third inner surface 255 in the third mid portion 250, the third proximal end portion 240 is removably engaged to the alternative topside 221 of the alternative buoyant element 201.

A further addition is a cover 300 having a cover outer surface 310 and an opposing cover inner surface 306, the cover 300 is removably engageable 307 to the third distal end portion 245 the third termination margin 241, the third surrounding sidewall 235 having a third interior 265 defined by the third inner surface 255, the cover inner surface 306, and the alternative topside 221. Another addition is a pump and motor combination 165 with a suction fluid communication structure 170 that is in fluid communication with the alternative first interior 126, the pump and motor combination 165 further includes a discharge fluid communication structure 176. Also included is a primary fluid communication structure 190 from the discharge fluid communication structure 176 to the tower structure 195 third interior 265.

Finally, included is an alternative secondary fluid communication structure 181 disposed within the alternative first interior 126 from the discharge fluid communication structure 176 to a spray nozzle 185 that is disposed within the alternative second interior 172, wherein operationally a nutrient rich fluid 55 is disposed within the alternative first interior 126, wherein the pump and motor combination 165 creates a pressure movement flow 70 of the nutrient rich fluid 55 from the suction fluid communication structure 170 to the discharge fluid communication structure 176 and onward to the primary fluid communication structure 190 to discharge the nutrient rich fluid 55 into the third interior 265, further the discharge fluid communication structure 176 also discharges the nutrient rich fluid 55 through the alternative secondary fluid communication structure 181 to the spray nozzle 185 to create a rotational movement 65 of the nutrient rich fluid 55 within the alternative second interior 172 to contact the alternative annular buoyant element 201 outer periphery 206 and the alternative submerged side 216 to rotate 236 the alternative annular buoyant element 201 that is resting on a buoyancy force 90 and to support the tower structure 195 that is in rotational 196 lockstep with the alternative annular buoyant element 201 resulting in having rotation 196 of the tower structure 195 to provide the nutrient rich fluid 55 to a plant 51 disposed within the plant aperture 280 and to provide selectable exposure to the light source 53 through the tower structure 195 rotation 196 about the longitudinal axis 100.

As an option for the alternative rotating planter apparatus 56, it can further comprise an enhanced annular extension 232 that is disposed on the alternative outer periphery 206 that is positioned radially outward of the alternative outer periphery 206 and the alternative top side 221, the enhanced annular extension 232 extends outward from the longitudinal axis 100 beyond the alternative second interior 172 outward from the longitudinal axis 100, to operationally help divert the gravity flow 76 of the nutrient rich fluid 55 away from the alternative second interior 172 to lessen interference from the gravity flow 76 of the nutrient rich fluid 55 to the spray nozzle 185 velocity 75 of the nutrient rich fluid 55, see FIG. 11.

Accordingly, the present invention of the Rotating Planter Apparatus 50 and the alternative embodiment Rotating Planter Apparatus 56 of the have been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:

1. A rotating planter apparatus that is in the form of a vertical planter that is disposed upon a resting surface and placed into an environment utilizing an external light source, said rotating planter apparatus comprising:

a. a first surrounding sidewall that is about a longitudinal axis, said first surrounding sidewall having a first distal end portion and an opposing first proximal end portion with said longitudinal axis spanning therebetween, said first surrounding sidewall further including a first inner surface and an opposing first outer surface;

b. a first base that is affixed to said first proximal end portion of said first surrounding sidewall, said first base includes a first base inside surface and an opposing first base outside surface, said first surrounding sidewall further including a first interior defined by said first inner surface and said first base inside surface;

c. a second surrounding sidewall that is about said longitudinal axis, said second surrounding sidewall having a first end portion and an opposing second end portion with said longitudinal axis spanning therebetween, said second surrounding sidewall further including a second inner surface and an opposing second outer surface;

d. a second base that is affixed to said first end portion of said second surrounding sidewall, said second base includes a second base inside surface and an opposing second base outside surface, said second surrounding sidewall further including a second interior defined by said second inner surface and said second base inside surface;

e. an annular buoyant element that is about said longitudinal axis, said annular buoyant element includes an outer periphery that is about said longitudinal axis and an opposing inner margin that is about said longitudinal axis, further said annular buoyant element includes a submerged side and an opposing top side, wherein said submerged side and said top side are both positioned perpendicular to said longitudinal axis, wherein said submerged side is disposed within said second interior;

f. a tower structure that is constructed from a third surrounding sidewall that is about said longitudinal axis, said third surrounding sidewall includes a third proximal end portion and an opposing third distal end portion with a third mid portion therebetween, with said longitudinal axis spanning therebetween said third proximal end portion, said third mid portion, and said third distal end portion, said third surrounding sidewall further includes a third inner surface and an opposing third outer surface, said third distal end portion terminating in a third termination margin, said third surrounding sidewall further includes a drain aperture disposed therethrough from said third outer surface to said third inner surface in said third proximal end portion and a plant aperture disposed therethrough from said third outer surface to said third inner surface in said third mid portion, said third proximal end portion is removably engaged to said topside of said buoyant element;

g. a cover having a cover outer surface and an opposing cover inner surface, said cover is removably engageable to said third distal end portion said third termination margin, said third surrounding sidewall having a third interior defined by said third inner surface, said cover inner surface, and said topside;

h. a pump and motor combination with a suction fluid communication structure that is in fluid communication with said first interior, said pump and motor combination further includes a discharge fluid communication structure;

i. a primary fluid communication structure from said discharge fluid communication structure to said tower structure third interior; and j. a secondary fluid communication structure from said discharge fluid communication structure to a spray nozzle that is disposed within said second interior, wherein operationally a nutrient rich fluid is disposed within said first interior, wherein said pump and motor combination creates a pressure movement flow of the nutrient rich fluid from said suction fluid communication structure to said discharge fluid communication structure and onward to said primary fluid communication structure to discharge the nutrient rich fluid into said third interior, further said discharge fluid communication structure also discharges the nutrient rich fluid through said secondary fluid communication structure to said spray nozzle to create a rotational movement of the nutrient rich fluid within said second interior to contact said annular buoyant element outer periphery and said submerged side to rotate said annular buoyant element that is resting on a buoyancy force and to support said tower structure that is in rotational lockstep with said annular buoyant element resulting in having rotation of said tower structure to provide the nutrient rich fluid to a plant disposed within said plant aperture and through said tower structure rotation about said longitudinal axis.

2. The rotating planter apparatus according to claim 1 further comprising a flow control valve that is disposed on said primary fluid communication structure from said discharge fluid communication structure to said tower structure third interior, wherein operationally said flow control valve provides for selectable intermittent flow from said pump and motor combination to said tower structure third interior to accommodate an intermittent plant hydration schedule.

3. The rotating planter apparatus according to claim 1 wherein said cover outer surface further comprises a modified cover outer surface that includes an aperture to further comprise a selectably adjustable friction rotational bearing that is disposed adjacent to said modified cover outer surface, a friction nut threaded stud that is threadbly affixed to a retainer that is affixed to said primary fluid communication, wherein said friction nut threaded stud is disposed therethrough said modified cover surface aperture, further a friction washer is disposed adjacent to said modified cover outer surface and disposed about said friction nut threaded stud wherein a manually selectable friction tightening nut is threadably engaged to said friction nut threaded stud to operationally create a variable clamping force to sandwich said friction washer between said friction nut and said modified cover outer surface, wherein operationally said selectably adjustable friction rotational bearing is to control a rotational speed of said annular buoyant element and said tower structure.

4. The rotating planter apparatus according to claim 1 further comprising a selectably adjustable power switch for said pump and motor combination to operationally deactivate said pump and motor combination to stop the plant hydration and to stop said tower structure rotation.

5. The rotating planter apparatus according to claim 1 further comprising a first base support that is disposed between said first inside surface of said first base and said primary communication structure to operationally give vertical support to said primary fluid communication structure.

6. The rotating planter apparatus according to claim 1 further comprising a second base support that is disposed between said second base and said primary fluid communication structure to operationally give vertical support to said primary fluid communication structure.

7. The rotating planter apparatus according to claim 1 further comprising an annular support that has an annular support outer periphery and an annular support inner periphery, wherein said annular support outer periphery is affixed to said third inner surface resulting in said annular support being disposed within said third interior and positioned adjacent to said third distal end portion, said annular support inner periphery having a slip fit rotational engagement to said primary fluid communication structure to operationally provide support perpendicular to said longitudinal axis for said primary fluid communication structure while accommodating said tower structure to rotation about said primary fluid communication structure, said annular support further includes an annular support first surface and an opposing annular support second surface with an aperture disposed therebetween to facilitate a gravity flow of the nutrient rich fluid to the plant within said third interior from said pressure movement flow of the nutrient rich fluid within said primary fluid communication structure.

8. The rotating planter apparatus according to claim 1 further comprising an annular extension that is disposed on said outer periphery that is positioned radially outward of said outer periphery and said top side, said annular extension extends outward from said longitudinal axis beyond said second interior outward from said longitudinal axis, to operationally help divert the gravity flow of the nutrient rich fluid away from said second interior to lessen interference from the gravity flow of the nutrient rich fluid to the spray nozzle velocity of the nutrient rich fluid.

9. The rotating planter apparatus according to claim 1 further comprising a plurality of paddle extensions that are disposed on said outer periphery that each extend outward in a perpendicular radial fashion from said longitudinal axis, said plurality of paddle extensions further enhance said rotation of said tower structure from said spray nozzle discharge of the nutrient rich fluid.

10. The rotating planter apparatus according to claim 9 further comprising an enhanced annular extension that is disposed on said outer periphery that is positioned to cover said plurality of paddle extensions and said top side, said enhanced annular extension extends outward from said longitudinal axis beyond said plurality of paddle extensions to operationally help divert the gravity flow of the nutrient rich fluid away from said plurality of paddle extensions to lessen interference from the gravity flow of the nutrient rich fluid to the spray nozzle velocity of the nutrient rich fluid.

11. The rotating planter apparatus according to claim 1 wherein said pump and motor combination is disposed within said first interior with said suction fluid communication structure that is completely disposed within said first interior and said discharge fluid communication structure that is completely disposed within said first interior.

12. The rotating planter apparatus according to claim 1 wherein said suction fluid communication structure is modified and said discharge fluid communication structure is modified such that said pump and motor combination is disposed outside of said first surrounding sidewall with said modified suction fluid communication structure that is in communication from said first interior to said pump and motor combination and said modified discharge fluid communication structure in communication from said pump and motor combination to said first interior.

13. A rotating planter apparatus that is in the form of a vertical planter that is disposed upon a resting surface and placed into an environment utilizing an external light source, said rotating planter apparatus comprising:

a. an alternative first surrounding sidewall that is about a longitudinal axis, said alternative first surrounding sidewall having an alternative first distal end portion and an opposing alternative first proximal end portion with said longitudinal axis spanning therebetween, said alternative first surrounding sidewall further including an alternative first inner surface and an opposing alternative first outer surface;

b. an alternative first base that is affixed to said alternative first proximal end portion of said alternative first surrounding sidewall, said alternative first base includes an alternative first base inside surface and an opposing alternative first base outside surface, said alternative first surrounding sidewall further including an alternative first interior defined by said alternative first inner surface and said alternative first base inside surface;

c. an alternative second surrounding sidewall that is about said longitudinal axis, said alternative second surrounding sidewall having an alternative first end portion and an opposing alternative second end portion with said longitudinal axis spanning therebetween, said alternative second surrounding sidewall further including an alternative second inner surface and an opposing alternative second outer surface, said alternative second inner surface is constructed of a plurality of adjacent convex segments that are each separated by a concave valley segment forming a continuous surface, wherein said plurality of convex segments and concave valley segments are about said longitudinal axis;

d. an alternative second base that is affixed to said alternative first end portion of said alternative second surrounding sidewall, said alternative second base includes an alternative second base inside surface and an opposing alternative second base outside surface, said alternative second surrounding sidewall further including an alternative second interior defined by said alternative second inner surface and said alternative second base inside surface;

e. an alternative annular buoyant element that is about said longitudinal axis, said alternative annular buoyant element includes an alternative outer periphery that is about said longitudinal axis and an opposing alternative inner margin that is about said longitudinal axis, further said alternative annular buoyant element includes an alternative submerged side and an alternative opposing top side, wherein said alternative submerged side and said alternative top side are both positioned perpendicular to said longitudinal axis, wherein said alternative submerged side is disposed within said alternative second interior, wherein said alternative outer periphery is constructed of a plurality of adjacent concave recesses that are each separated by a convex peak, resulting in a plurality of concave recesses and a plurality of convex peaks forming a continuous surface, wherein said plurality of convex peaks are numerically one less than said plurality of said concave valley segments, wherein an alternative second interior is formed between said alternative outer periphery and said alternative second inner surface, further said alternative annular buoyant element, said alternative second interior, and said alternative second surrounding sidewall form a quasi Gerotor hydraulic motor;

f. a tower structure that is constructed from a third surrounding sidewall that is about said longitudinal axis, said third surrounding sidewall includes a third proximal end portion and an opposing third distal end portion with a third mid portion therebetween, with said longitudinal axis spanning therebetween said third proximal end portion, said third mid portion, and said third distal end portion, said third surrounding sidewall further includes a third inner surface and an opposing third outer surface, said third distal end portion terminating in a third termination margin, said third surrounding sidewall further includes a drain aperture disposed therethrough from said third outer surface to said third inner surface in said third proximal end portion and a plant aperture disposed therethrough from said third outer surface to said third inner surface in said third mid portion, said third proximal end portion is removably engaged to said alternative topside of said buoyant element;

g. a cover having a cover outer surface and an opposing cover inner surface, said cover is removably engageable to said third distal end portion said third termination margin, said third surrounding sidewall having a third interior defined by said third inner surface, said cover inner surface, and said alternative topside;

h. a pump and motor combination with a suction fluid communication structure that is in fluid communication with said alternative first interior, said pump and motor combination further includes a discharge fluid communication structure;

i. a primary fluid communication structure from said discharge fluid communication structure to said tower structure third interior; and j. an alternative secondary fluid communication structure disposed within said alternative first interior from said discharge fluid communication structure to a spray nozzle that is disposed within said alternative second interior, wherein operationally a nutrient rich fluid is disposed within said alternative first interior, wherein said pump and motor combination creates a pressure movement flow of the nutrient rich fluid from said suction fluid communication structure to said discharge fluid communication structure and onward to said primary fluid communication structure to discharge the nutrient rich fluid into said third interior, further said discharge fluid communication structure also discharges the nutrient rich fluid through said alternative secondary fluid communication structure to said spray nozzle to create a rotational movement of the nutrient rich fluid within said alternative second interior to contact said alternative annular buoyant element outer periphery and said alternative submerged side to rotate said alternative annular buoyant element that is resting on a buoyancy force and to support said tower structure that is in rotational lockstep with said alternative annular buoyant element resulting in having rotation of said tower structure to provide the nutrient rich fluid to a plant disposed within said plant aperture and through said tower structure rotation about said longitudinal axis.

14. The rotating planter apparatus according to claim 13 further comprising a flow control valve that is disposed on said primary fluid communication structure from said discharge fluid communication structure to said tower structure third interior, wherein operationally said flow control valve provides for selectable intermittent flow from said pump and motor combination to said tower structure third interior to accommodate an intermittent plant hydration schedule.

15. The rotating planter apparatus according to claim 13 wherein said cover outer surface further comprises a modified cover outer surface that includes an aperture to further comprise a selectably adjustable friction rotational bearing that is disposed adjacent to said modified cover outer surface, a friction nut threaded stud that is threadbly affixed to a retainer that is affixed to said primary fluid communication, wherein said friction nut threaded stud is disposed therethrough said modified cover surface aperture, further a friction washer is disposed adjacent to said modified cover outer surface and disposed about said friction nut threaded stud wherein a manually selectable friction tightening nut is threadably engaged to said friction nut threaded stud to operationally create a variable clamping force to sandwich said friction washer between said friction nut and said modified cover outer surface, wherein operationally said selectably adjustable friction rotational bearing is to control a rotational speed of said alternative annular buoyant element and said tower structure.

16. The rotating planter apparatus according to claim 13 further comprising an annular support that has an annular support outer periphery and an annular support inner periphery, wherein said annular support outer periphery is affixed to said third inner surface resulting in said annular support being disposed within said third interior and positioned adjacent to said third distal end portion, said annular support inner periphery having a slip fit rotational engagement to said primary fluid communication structure to operationally provide support perpendicular to said longitudinal axis for said primary fluid communication structure while accommodating said tower structure to rotation about said primary fluid communication structure, said annular support further includes an annular support first surface and an opposing annular support second surface with an aperture disposed therebetween to facilitate a gravity flow of the nutrient rich fluid to the plant within said third interior from said pressure movement flow of the nutrient rich fluid within said primary fluid communication structure.

17. The rotating planter apparatus according to claim 13 further comprising an enhanced annular extension that is disposed on said alternative outer periphery that is positioned radially outward of said alternative outer periphery and said alternative top side, said enhanced annular extension extends outward from said longitudinal axis beyond said alternative second interior outward from said longitudinal axis, to operationally help divert the gravity flow of the nutrient rich fluid away from said alternative second interior to lessen interference from the gravity flow of the nutrient rich fluid to the spray nozzle velocity of the nutrient rich fluid.

18. The rotating planter apparatus according to claim 13 wherein said pump and motor combination is disposed within said alternative first interior with said suction fluid communication structure that is completely disposed within said alternative first interior and said discharge fluid communication structure that is completely disposed within said alternative first interior.

19. The rotating planter apparatus according to claim 13 wherein said suction fluid communication structure is modified and said discharge fluid communication structure is modified such that said pump and motor combination is disposed outside of said alternative first surrounding sidewall with said modified suction fluid communication structure that is in communication from said alternative first interior to said pump and motor combination and said modified discharge fluid communication structure in communication from said pump and motor combination to said alternative first interior.

20. The rotating planter apparatus according to claim 13 further comprising a second base support that is disposed between said alternative second base and said primary fluid communication structure to operationally give vertical support to said primary fluid communication structure.

* * * * *